(12) United States Patent
Sawanaka et al.

(10) Patent No.: US 10,539,825 B2
(45) Date of Patent: Jan. 21, 2020

(54) PLANAR LIGHT SOURCE APPARATUS, DISPLAY APPARATUS, AND METHOD OF MANUFACTURING PLANAR LIGHT SOURCE APPARATUS

(71) Applicant: MITSUBISHI ELECTRIC CORPORATION, Tokyo (JP)

(72) Inventors: Tomohiko Sawanaka, Tokyo (JP); Masaaki Takeshima, Tokyo (JP); Saki Maeda, Tokyo (JP); Tatsuya Matsumoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/830,702

(22) Filed: Dec. 4, 2017

(65) Prior Publication Data

US 2018/0180943 A1   Jun. 28, 2018

(30) Foreign Application Priority Data

Dec. 22, 2016 (JP) ................................. 2016-248687
Dec. 22, 2016 (JP) ................................. 2016-248735

(51) Int. Cl.
  *F21V 33/00* (2006.01)
  *G02F 1/13357* (2006.01)

(52) U.S. Cl.
  CPC .. *G02F 1/133606* (2013.01); *G02F 1/133603* (2013.01); *G02F 1/133605* (2013.01); *G02F 2001/133607* (2013.01)

(58) Field of Classification Search
  CPC ............ G02F 1/1336; G02F 1/133602; G02F 1/133603

USPC ...................... 235/97.1, 97.2; 362/97.1, 97.2
See application file for complete search history.

(56) References Cited

U.S. PATENT DOCUMENTS

| | | | | |
|---|---|---|---|---|
| 2008/0089091 A1* | 4/2008 | Matsushita | .......... | G02B 6/0021 362/603 |
| 2013/0010231 A1* | 1/2013 | Matsuki | ............ | G02F 1/133603 349/64 |
| 2014/0321162 A1* | 10/2014 | Toki | .................. | G02F 1/133611 362/615 |

FOREIGN PATENT DOCUMENTS

JP    2006-286608 A    10/2006
JP    2014-38697 A     2/2014

* cited by examiner

*Primary Examiner* — Daniel St Cyr
(74) *Attorney, Agent, or Firm* — Birch, Stewart, Kolasch & Birch, LLP

(57) ABSTRACT

A planar light source apparatus according to the present invention includes a light source, a holding substrate that holds the light source at a main surface, and a light-distribution control element that is disposed at the main surface of the holding substrate so as to cover the light source, and changes light distribution of light rays emitted from the light source. The light-distribution control element includes a diffusion part that is provided at at least one surface of a plurality of surfaces that structure the outer shape of the light-distribution control element. The at least one surface where the diffusion part is provided is a surface different from an installation surface capable of abutting on the main surface of the holding substrate.

14 Claims, 17 Drawing Sheets

F I G. 9
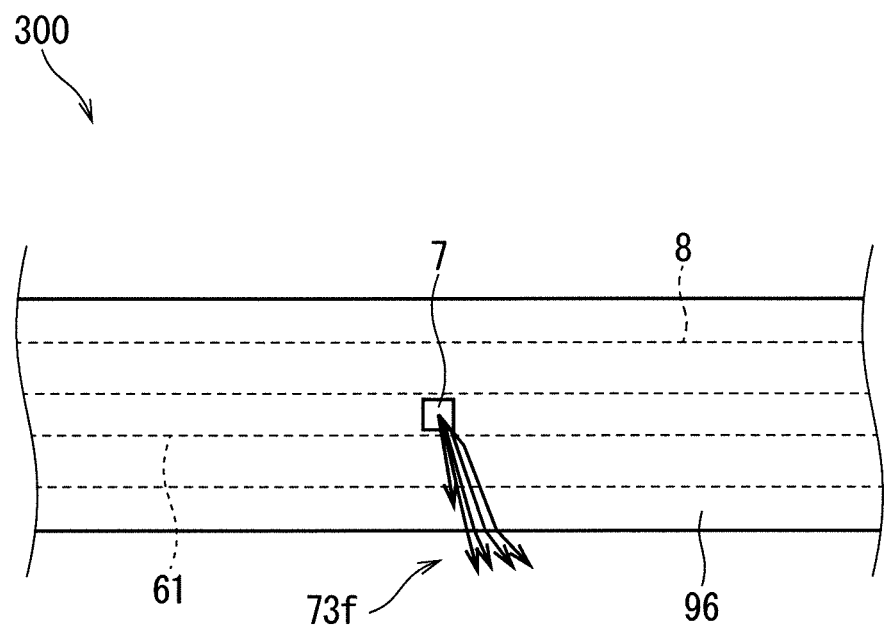

PLANAR LIGHT SOURCE APPARATUS, DISPLAY APPARATUS, AND METHOD OF MANUFACTURING PLANAR LIGHT SOURCE APPARATUS

BACKGROUND OF THE INVENTION

Field of the Invention

The present invention relates to a planar light source apparatus that emits planar light, a display apparatus that displays an image on a display panel by the display panel being illuminated by the planar light source apparatus, and a method of manufacturing the planar light source apparatus.

Description of the Background Art

A liquid crystal panel included in a liquid crystal display apparatus does not produce light by itself. Therefore, the liquid crystal display apparatus includes, as a light source for illuminating the liquid crystal panel, a backlight apparatus, that is, a planar light source apparatus, on the rear surface side of the liquid crystal panel. One structure of the backlight apparatus is a direct illumination-type backlight apparatus in which a plurality of light emitting diodes (hereinafter referred to as LEDs) are arranged. Recent years have seen the development of compact, high-efficient, and high-output LEDs. Thus, even with a reduced number of installed LEDs or a reduced number of installed LED bars, which are light sources formed by the plurality of LEDs arranged in a row, the backlight apparatus can mathematically attain the same brightness as the conventional backlight apparatuses. Japanese Patent Application Laid-Open No. 2006-286608 or Japanese Patent Application Laid-Open No. 2014-38697 discloses a backlight apparatus that spreads light rays emitted from an LED with a cylindrical lens, thereby converting into planar illumination light.

In the backlight apparatus disclosed by Japanese Patent Application Laid-Open No. 2006-286608 or Japanese Patent Application Laid-Open No. 2014-38697, when the light transmits from inside of the cylindrical lens to the air, part of the light is reflected at the interface between the cylindrical lens and the air. In order to improve evenness of illumination light, both the direct light that transmits through the interface and the reflected light reflected at the interface may be used as illumination light. However, the reflected light increases as the divergence angle of light emitted from the light source increases, that is, as the incident angle of light rays relative to the interface increases. In particular, it is difficult to suppress a reduction in the amount of light at the periphery of the emission region.

Further, recent reduction in size and increase in efficiency of the light source require higher precision in relation to disposition of an LED and an optical component that spreads the light rays emitted from the LED, and in the shape of optical members. In view of the manufacturing processes and costs, what is desired is a backlight apparatus with which such light source and optical component can be mounted with a simple holding structure. To this end, it is necessary to reduce the luminance distribution sensitivity of the irradiated surface to the precision in disposition of the light source and the optical component, and in the shape of the optical members.

SUMMARY OF THE INVENTION

An object of the present invention is to provide a planar light source apparatus that exhibits high robustness in relation to disposition of a light-distribution control element and a holding substrate, or disposition of the light-distribution control element and a light source, and improves productivity. The planar light source apparatus of the present invention includes a light source, a holding substrate that holds a light source at a main surface, and a light-distribution control element that is disposed at the main surface of the holding substrate so as to cover the light source, and changes light distribution of light rays emitted from the light source. The light-distribution control element includes a diffusion part that is provided at at least one surface of a plurality of surfaces structuring an outer shape of the light-distribution control element. The at least one surface where the diffusion part is provided is a surface different from an installation surface capable of abutting on the main surface of the holding substrate.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 5 to 9 are diagrams each showing light rays emitted from light sources of a planar light source apparatus according to an underlying technology;

DESCRIPTION OF THE PREFERRED EMBODIMENTS

With reference to the drawings, a description will be given of preferred embodiments of a planar light source apparatus and a display apparatus including the planar light source apparatus in the present specification. Note that, in the following preferred embodiments, the display apparatus is exemplarily described as a liquid crystal display apparatus, and the display panel included in the display apparatus is exemplarily described as a liquid crystal panel.

Figure 1:
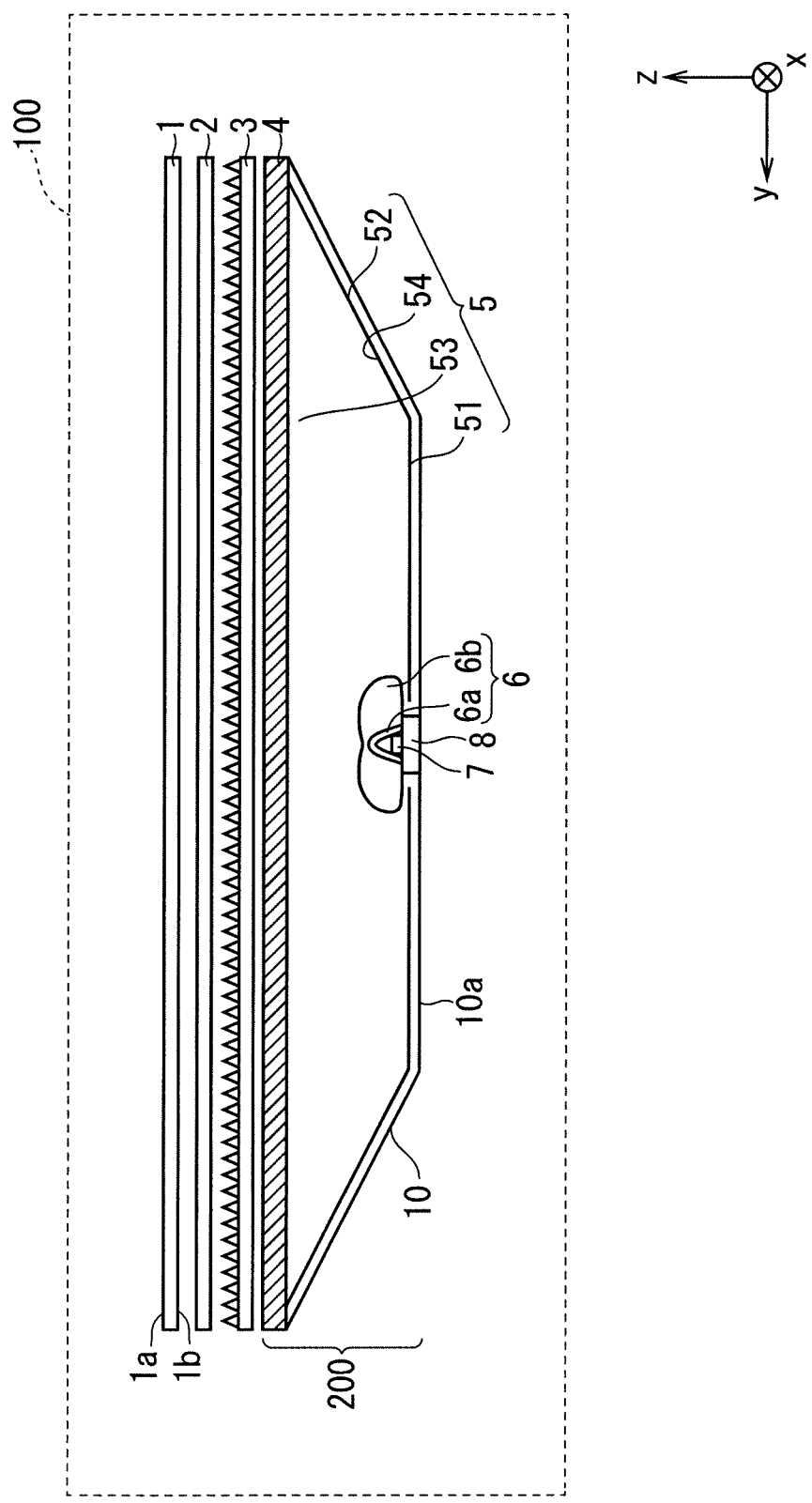
FIG. 1 is a section view showing the structure of a liquid crystal display apparatus according to a first preferred embodiment.

In the following preferred embodiments, the display apparatus and the planar light source apparatus are illustrated based on x-y-z orthogonal coordinates. A direction perpendicular to an x-y plane including an x axis and a y axis is a z-axis direction. For example, when the display panel included in the display apparatus is quadrangular, the long-side direction of the display panel is defined as an x-axis direction, and the short-side direction thereof is defined as a y-axis direction. FIG. 1 is a section view that schematically shows the structure of a planar light source apparatus 200 and a liquid crystal display apparatus 100 including the same according to a first preferred embodiment which will be described later. In FIG. 1, the long-side direction of the liquid crystal panel 1 is a direction perpendicular to the surface of the drawing, and the short-side direction is the right-left direction of the drawing. In the case where the long side of the liquid crystal display apparatus 100, that is, the long side of the liquid crystal panel 1, is horizontally oriented and the short-side direction thereof is vertically oriented, the x-axis direction is the horizontal direction and the y-axis direction is the vertical direction. Further, in this case, the upper side of the liquid crystal display apparatus 100 is in the positive direction on the y axis (+y-axis direction), and the lower side thereof is in the negative direction on the y axis (−y-axis direction). Further, the direction in which the liquid crystal display apparatus 100 displays an image is the positive direction on the z axis (+z-axis direction), and the direction opposite thereto is the negative direction on the z axis (−z-axis direction). Further, the +z-axis direction is referred to as a display surface side. The −z-axis direction is referred to as a rear surface side. Further, as seen from the display surface side of the liquid crystal display apparatus 100, the right side is the positive direction on the x axis (+x-axis direction), and the left side is the negative direction on the x axis (−x-axis direction). As used herein, "as seen from the display surface side" means viewing the −z-axis direction from the +z-axis direction. Note that, in the present specification, when an axis direction is referred to without the positive or negative sign, both the positive and negative directions are included. For example, the term "the y-axis direction" includes both the +y-axis direction and the −y-axis direction. This is not limited to the first preferred embodiment, and the same holds true to other preferred embodiments.

First Preferred Embodiment

Liquid Crystal Display Apparatus

FIG. 1 is a section view schematically showing the structure of the planar light source apparatus 200 and the liquid crystal display apparatus 100 including the planar light source apparatus 200 according to the first preferred embodiment. The liquid crystal display apparatus 100 includes a liquid crystal panel 1 of the transmissive type, and the planar light source apparatus 200. Further, the liquid crystal display apparatus 100 further includes, between the liquid crystal panel 1 and the planar light source apparatus 200, optical sheets 2 and 3. Further, a diffuser 4 is disposed at the light emitting surface of the planar light source apparatus 200. That is, the diffuser 4 is provided at an opening 53 of the planar light source apparatus 200. From the +z-axis direction to the −z-axis direction in order, the liquid crystal panel 1, the optical sheets 2 and 3, the diffuser 4, and the planar light source apparatus 200 are disposed. The liquid crystal panel 1 has a rear surface 1b that opposes to the planar light source apparatus 200 via the optical sheets 2 and 3. Further, the liquid crystal panel 1 has a display surface 1a on the side opposite to the rear surface 1b. The rear surface 1b is a surface oriented in the −z-axis direction of the liquid crystal panel 1, and the display surface 1a is a surface oriented in the +z-axis direction thereof. The display surface 1a has a planar quadrangular shape. That is, the display surface 1a has a plane that spreads in the direction parallel to the x-y plane. Further, the longs sides in the x-axis direction and the short sides in the y-axis direction structuring the plane are perpendicular to each other. Note that, the shape of the display surface 1a described above is merely an example, and may be different. Further, the liquid crystal panel 1 includes a liquid crystal layer (not shown), and the liquid crystal layer has a planar structure that spreads in the direction parallel to the x-y plane.

The planar light source apparatus 200 emits planar light from the diffuser 4, and illuminates the rear surface 1b of the liquid crystal panel 1 through the optical sheets 3 and 2. The optical sheet 3 has a function of directing the light emitted from the diffuser 4 normal to the display surface 1a of the liquid crystal panel 1. The optical sheet 2 reduces minor unevenness in the illumination light and reduces optical malfunction. The liquid crystal panel 1 converts the illumination light input from the rear surface 1b into image light. The "image light" means light that has image information.

Planar Light Source Apparatus

The planar light source apparatus 200 includes a light-distribution control element 6, a light source 7, and a holding substrate 8. Further, in the present preferred embodiment, the planar light source apparatus 200 further includes a reflector 5 and a housing 10. The reflector 5 has a container shape capable of housing the light-distribution control element 6 and the light source 7. The reflector 5 includes a bottom surface 51, a side surface 52, and an opening 53. The housing 10 is a member that holds and houses the reflector 5 and the holding substrate 8. The reflector 5 is disposed along the inner wall of the housing 10. Reflecting the shape of the reflector 5, the housing 10 has a container shape, including an opening at its upper part, that is, in the direction where the liquid crystal panel 1 is disposed. The material of the housing 10 is, for example, resin or a metal plate.

Figure 2:
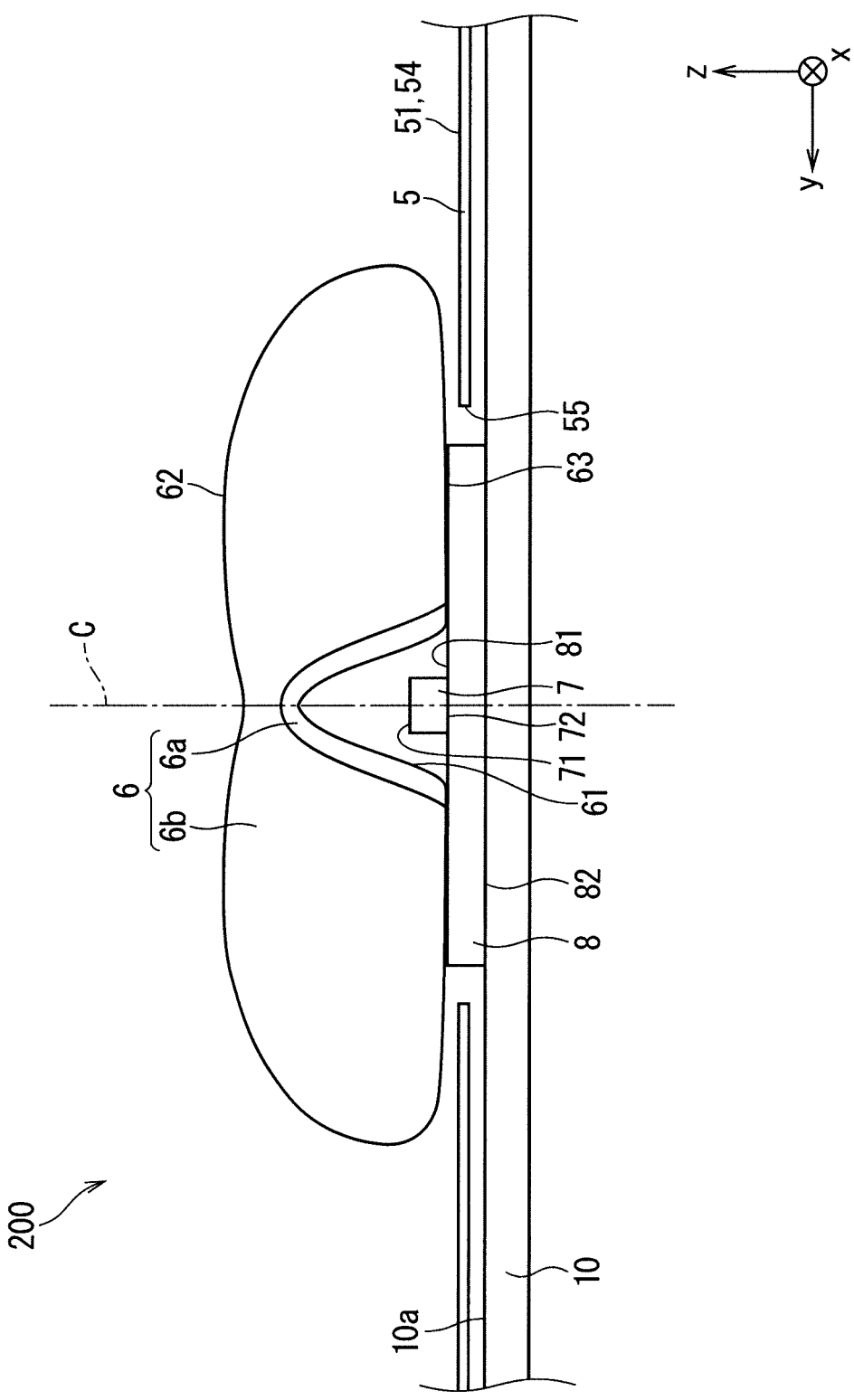
FIG. 2 is a section view showing around a light source of a planar light source apparatus according to the first preferred embodiment.

FIG. 2 is a section view showing around the light source 7 of the planar light source apparatus 200 in an enlarged manner. The light source 7 is disposed at a main surface 81 of the holding substrate 8. The light-distribution control element 6 is disposed at the main surface 81 of the holding substrate 8 so as to cover the light source 7.

Holding Substrate

In the first preferred embodiment, the outer shape of the holding substrate 8 is elongated in the x-axis direction. That is, the outer shape of the holding substrate 8 is elongated in the longitudinal direction of the light-distribution control element 6, and the arrangement direction of the light sources 7 which will be described later. Further, in a plan view, the holding substrate 8 is quadrangular plate-like. Still further, the holding substrate 8 has the main surface 81. The main surface 81 is the front surface of the holding substrate 8, which front surface is, for example, an installation surface. The holding substrate 8 is an installation substrate where the light sources 7 which will be described later are installed at its main surface 81. The main surface 81 of the holding substrate 8 includes, for example, a white resist layer or a white silk layer on a resist layer, and has a function as a reflecting surface. The holding substrate 8 at which the light sources 7 and the light-distribution control element 6 are disposed is held at a bottom surface 10a of the housing 10. The surface of the holding substrate 8 held at the bottom surface 10a of the housing 10 is a rear surface 82 on the side opposite to the main surface 81. The rear surface 82 of the holding substrate 8 is a surface of the holding substrate 8 oriented in the −z-axis direction. The rear surface 82 of the holding substrate 8 transfers the heat generated by the light sources 7 to the housing 10 through the main surface 81 of the holding substrate 8, to dissipate the heat. Further, the planar light source apparatus 200 may be, for example, provided with a heat dissipation sheet between the holding substrate 8 and the housing 10, to enhance the heat dissipation effect.

Light Sources

Figure 3:
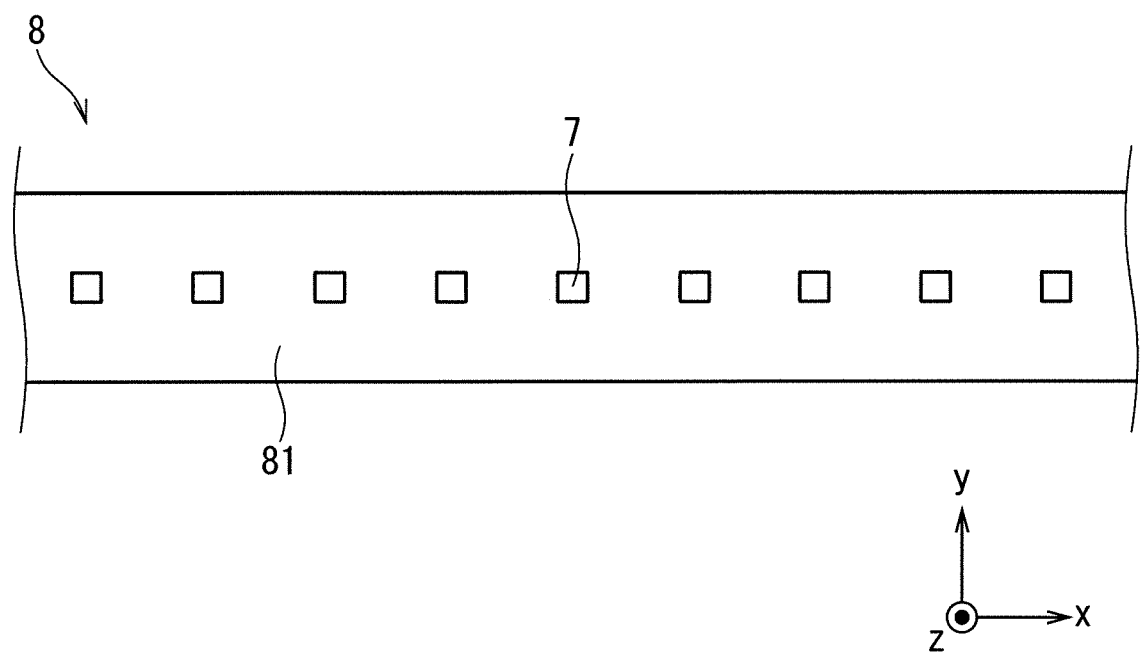
FIG. 3 is a plan view showing disposition of light sources of the planar light source apparatus according to the first preferred embodiment.

The light source 7 is disposed at the main surface 81 of the holding substrate 8. In the first preferred embodiment, the planar light source apparatus 200 includes a plurality of light sources. FIG. 3 is a plan view of the light sources 7 disposed at the main surface 81 of the holding substrate 8. FIG. 3 does not show the light-distribution control element 6 disposed at the main surface 81 of the holding substrate 8. Each of light sources 7 is arranged in a row at the main surface 81 of the holding substrate 8 discretely, that is, at predetermined intervals. The arrangement direction is the x-axis direction.

Further, as shown in FIG. 2, a rear surface 72 that is a surface of the light source 7 oriented in the −z-axis direction is in contact with the main surface 81 of the holding substrate 8. Accordingly, the light sources 7 are held at the holding substrate 8. Further, the light sources 7 are electrically connected to the holding substrate 8, and the light sources 7 are each supplied with power via the rear surface 72. Further, in the first preferred embodiment, the surfaces of each light source 7 other than the rear surface 72 are light emission surfaces. For example, a front surface 71 opposite to the rear surface 72 of each light source 7 is a light emission surface. Alternatively, for example, when the light sources 7 are each rectangular parallelepiped-shaped, the five surfaces of each light source 7 excluding the rear surface 72 are the light emission surfaces.

The light sources 7 are each, for example, a solid-state light source. The solid-state light source is, for example, an LED. Alternatively, examples of the light sources 7 include organic electroluminescence light sources and light sources that emit light by a phosphor applied to a flat surface being irradiated with excitation light. Note that, in the first preferred embodiment, the light sources 7 are LEDs.

Light-Distribution Control Element

The light-distribution control element 6 is disposed at the main surface 81 of the holding substrate 8 so as to cover the light sources 7. That is, the light-distribution control element 6 is disposed in the +z-axis direction with reference to the light sources 7 so as to surround light sources 7. In the first preferred embodiment, the light-distribution control element 6 is an optical element which is elongated in the arrangement direction of the plurality of light sources, that is, in the x-axis direction. For example, the light-distribution control element 6 is a cylindrical lens. The cylindrical lens is a lens that has a cylindrical refracting surface. The cylindrical lens has a curvature in a first direction, and does not have a curvature in a second direction which is perpendicular to the first direction. The light exiting from the cylindrical lens is condensed in one direction or diverged. For example, when parallel light rays enter a convex cylindrical lens, the light rays are linearly condensed. The condensed light is called a focal line. In the first preferred embodiment, the first direction is the direction perpendicular to the arrangement direction of the light sources 7, that is, the y-axis direction. The second direction is a direction parallel to the arrangement direction of the light sources 7, that is, the x-axis direction.

As shown in FIG. 2, of a plurality of surfaces that structure the outer shape of the light-distribution control element 6, a rear surface, that is, an installation surface 63 that opposes to the holding substrate 8 and abuts on the main surface 81 of the holding substrate 8. Thus, the light-distribution control element 6 is held at the holding substrate 8. In the first preferred embodiment, the installation surface 63 includes a surface which is parallel to the main surface 81 of the holding substrate 8.

The plurality of surfaces that form the outer shape of the light-distribution control element 6 include a light incident surface 61 at a position different from the installation surface 63. The light incident surface 61 is positioned to cover the light sources 7, and is formed by a concave curved surface or a flat surface. The concave curved surface is, for example, an aspheric surface or a cylindrical surface. The light incident surface 61 extends in the arrangement direction of the light sources 7, that is, in the longitudinal direction of the light-distribution control element 6. That is, the light incident surface 61 is groove-shaped. On the light incident surface 61, light emitted from the light sources 7 becomes incident.

Further, the plurality of surfaces that structure the outer shape of the light-distribution control element 6 include a light emitting surface 62 at a position different from the installation surface 63. The light emitting surface 62 is positioned on the side opposite to the light sources 7 with reference to the light incident surface 61. That is, the light emitting surface 62 is the surface of the light-distribution control element 6 oriented in the +z-axis direction, that is, the surface exposed in the +z-axis direction. The light emitting surface 62 includes a convex cylindrical surface, and the cylindrical surface has a convex curvature in the surface perpendicular to the arrangement direction of the light sources 7, that is, in the y-z plane. Further, the light emitting surface 62 is greater in area than the light incident surface 61. The light entering from the light incident surface 61 exits outside the light-distribution control element 6 from the light emitting surface 62.

The light-distribution control element 6 includes a diffusion part 6a provided at least at one surface. The at least one surface is one of the plurality of surfaces that structure the outer shape of the light-distribution control element 6. The at least one surface where the diffusion part 6a is provided is different from the installation surface 63. In the first preferred embodiment, the diffusion part 6a is provided along the light incident surface 61, and extends in the longitudinal direction of the light-distribution control element 6. Further, herein, the diffusion part 6a is provided at a front surface of the at least one surface, and include a smooth surface that is not a coarse surface at the front surface. The smooth surface is, for example, a flat surface or a curved surface that forms a mirror surface. The smooth surface is formed by extrusion which will be described later. Note that, while the diffusion part 6a shown in FIG. 2 is provided on the entire light incident surface 61, the diffusion part 6a may be provided at part of the light incident surface 61.

The diffusion part 6a contains a diffusing material. The diffusion part 6a is formed by a base material containing a diffusing agent. The base material of the diffusion part 6a containing the diffusing material is, for example, acrylic resin (PMMA). The diffusion part 6a has a thickness, the distribution of which is even. The thickness of the diffusion part 6a or the concentration of the diffusing material contained in the diffusion part 6a is adjusted so that the degree of diffusion of light by the diffusion part 6a becomes smaller as compared to the degree of refraction of the light rays at the light incident surface 61 or the light emitting surface 62. That is, the thickness of the diffusion part 6a or the concentration of the diffusing material contained in the diffusion part 6a will not cancel the effect of the light distribution control exerted by the light incident surface 61 or the light emitting surface 62.

The light-distribution control element 6 further includes a light-distribution control element body 6b that includes the light emitting surface 62 and the installation surface 63. The light-distribution control element body 6b is made of a transparent material. For example, the transparent material is acrylic resin (PMMA). While the light-distribution control element body 6b may contain the diffusing material, in such a case, the light-distribution control element body 6b is lower in concentration of the diffusing material than the diffusion part 6a of the light-distribution control element 6. That is, the light-distribution control element body 6b is higher in transparency than the diffusion part 6a.

The diffusion part 6a and the light-distribution control element body 6b are an integrated component. That is, the light-distribution control element 6 is a component in which the diffusion part 6a and the light-distribution control element body 6b are integrally molded. The front surface of the diffusion part 6a and the surface of the light-distribution control element body 6b being adjacent to the diffusion part 6a are preferably flush with each other.

As shown in FIG. 2, the above-described light sources 7 are disposed in the recess formed by the light incident surface 61 of the light-distribution control element 6. The recess means the space surrounded by the light incident surface 61 and the main surface 81 of the holding substrate 8. That is, the recess is the space positioned in the −z-axis direction of the light incident surface 61.

An optical axis C of the light-distribution control element 6 is parallel to the z axis. The "optical axis" herein is a straight line that passes through the center and a focal point of a lens or a spherical mirror. When an optical element has a cylindrical surface, the optical axis C is determined by the sectional shape of the optical element having a curvature. In the first preferred embodiment, the optical axis C is determined by the plane perpendicular to the arrangement direction of the light sources 7, that is, the shape of the light emitting surface 62 in the y-z plane perpendicular to the x-axis direction.

The light-distribution control element 6 has a function of spreading, in a predetermined direction, the propagating direction of light emitted from the light sources 7, thereby changing light distribution. In the first preferred embodiment, the predetermined direction is the direction in which the cylindrical surface of the light-distribution control element 6 spreads light, and is a direction parallel to the bottom surface 51 of the reflector 5 which will be described later and perpendicular to the longitudinal direction of the light-distribution control element 6. Note that, in the first preferred embodiment, the bottom surface 51 of the reflector 5 is parallel to the main surface 81 of the holding substrate 8. Accordingly, the predetermined direction is the direction parallel to the main surface 81 of the holding substrate 8 and perpendicular to the longitudinal direction of the light-distribution control element 6. That is, the direction is the y-axis direction.

Note that, the "light distribution" refers to luminous intensity distribution of the light source to the space. That is, the "light distribution" is the spatial distribution of light emitted from the light sources. Further, the "luminous intensity" indicates the intensity of light emitted from a luminous element, and is obtained by dividing a pencil of light passing within a minute solid angle in a certain direction by the minute solid angle. That is, the luminous intensity is a physical quantity that represents the degree of intensity of light emitted from a light source. With such a structure, the light-distribution control element 6 condenses or diverges light emitted from the light sources 7 on the y-z plane.

Further, as described above, the light-distribution control element 6 is bar-shaped. Accordingly, in the planar light source apparatus 200, the number of the light-distribution control element 6 can be smaller than the number of the light sources 7 arranged in a row. For example, in the first preferred embodiment, while the planar light source apparatus 200 includes the light sources 7, the number of installed light-distribution control element 6 is one. In this manner, when the light-distribution control element 6 is bar-shaped, the number of installed light-distribution control element 6 can be reduced with the planar light source apparatus 200. Further, an operation of attaching the light-distribution control element 6 just requires fixing one light-distribution control element 6 relative to the light sources 7 arranged in a row and, therefore, fixing work such as bonding is performed easily.

Reflector

Figure 4:
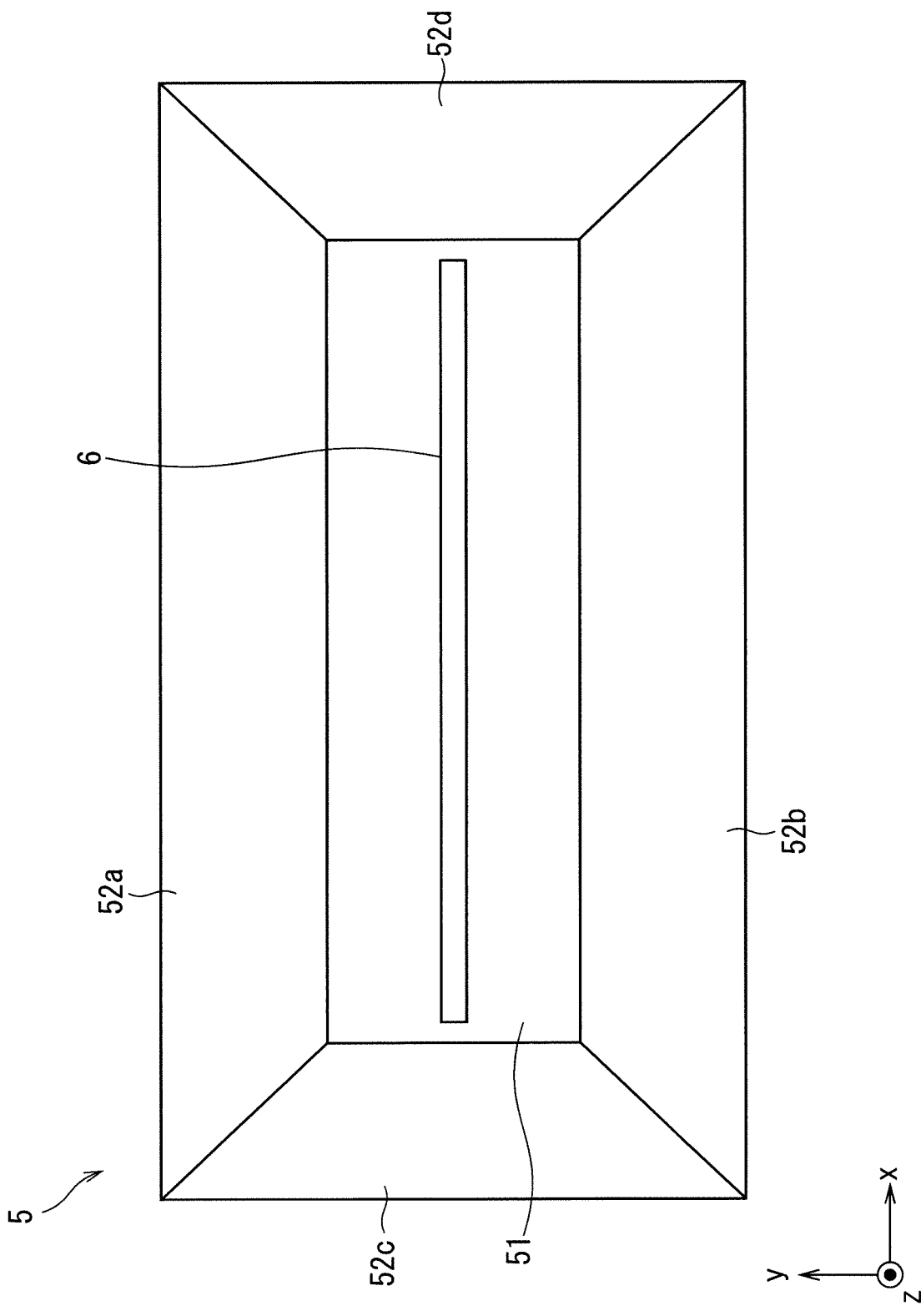
FIG. 4 is a plan view showing a reflector of the planar light source apparatus according to the first preferred embodiment.

As shown in FIG. 1, in the first preferred embodiment, the planar light source apparatus 200 includes the reflector 5. The reflector 5 has a container shape capable of housing the light sources 7 and the light-distribution control element 6 held at the holding substrate 8. FIG. 4 is a plan view of the reflector 5. Note that, FIG. 4 does not show the diffuser 4. As shown in FIG. 4, the reflector 5 has one bottom surface 51 which is parallel to the x-y plane and four side surfaces 52 (side surfaces 52a, 52b, 52c, 52d) that are connected to the bottom surface 51. In this manner, the reflector 5 has five surfaces. As shown in FIG. 1, the side surfaces 52 of the reflector 5 surround the outer circumference of the opening 53 that opposes to the bottom surface 51. In the first preferred embodiment, the bottom surface 51 of the reflector 5 has a quadrangular shape which is smaller than the quadrangular shape of the diffuser 4. Further, the bottom surface 51 of the reflector 5 is disposed in parallel to the diffuser 4, that is, in parallel to the light emitting surface of the planar light source apparatus 200. Still further, the side surfaces 52 of the reflector 5 connect between the outer circumference of the bottom surface 51 and the outer circumference of the diffuser 4. That is, the four side surfaces 52 are inclined from the outer circumference of the bottom surface 51 of the reflector 5 toward the outer circumference of the diffuser 4. In this manner, the reflector 5 and the diffuser 4 structure a hollow container shape.

In the following, a description will be given of the shape of the reflector 5 based on the x-y-z coordinate axes. Out of the four side surfaces 52 shown in FIG. 4, two side surfaces 52a and 52b connected to two sides of the bottom surface 51 of the reflector 5 which are parallel to the x-axis direction are inclined so as to be increasingly spaced apart from each other toward the +z-axis direction. That is, the side surface 52a in the +y-axis direction is inclined counterclockwise relative to the y-z plane about the connected portion with the bottom surface 51 as seen from the −x-axis direction. Further, the side surface 52b in the −y-axis direction is inclined clockwise relative to the y-z plane about the connected portion with the bottom surface 51 of the reflector 5 as seen from the −x-axis direction. Still further, out of the four side surfaces 52, two side surfaces 52c and 52d connected to sides of the bottom surface 51 of the reflector 5 which are parallel to the y-axis direction are also inclined so as to be increasingly spaced apart from each other toward the +z-axis direction. That is, the side surface 52c in the −x-axis direction is inclined counterclockwise relative to the z-x plane about the connected portion with the bottom surface 51 of the reflector 5 as seen from the −y-axis direction. Further, the side surface 52d in the +x-axis direction is inclined clockwise relative to the z-x plane about the connected portion with the bottom surface 51 of the reflector 5 as seen from the −y-axis direction. In the +z-axis direction of the reflector 5 that is opposite to the bottom surface 51 of the reflector 5, the opening 53 is formed.

As shown in FIG. 1 or 4, within a surface defined by the bottom surface 51 of the reflector 5, the light sources 7 and the light-distribution control element 6 held at the holding substrate 8 are disposed. That is, in a plan view of the planar light source apparatus 200, the light sources 7 and the light-distribution control element 6 are disposed within the surface of the bottom surface 51 of the reflector 5.

Further, the bottom surface 51 of the reflector 5 according to the first preferred embodiment has an opening corresponding to the position where the holding substrate 8 is disposed. As shown in FIG. 2, a contour part 55 that forms the opening is positioned on the opposite sides of the holding substrate 8, and disposed between the light-distribution control element 6 and the housing 10. That is, the contour part 55 is disposed so as to surround the outer circumference of the holding substrate 8 as seen in a plan view, and disposed at the clearance between the light-distribution control element 6 and the housing 10 as seen in a section view.

As shown in FIGS. 1 and 2, the reflector 5 has a reflecting surface 54 inside. The reflector 5 is a member that reflects light, and the reflecting surface 54 is, for example, a reflection sheet being a sheet-like member. The reflecting surface 54 of the reflector 5 may be, for example, a diffusively reflecting surface. The reflector 5 may be a light reflection sheet made of resin such as polyethylene terephthalate as a base material, or a light reflection sheet obtained by vapor deposition of metal on a surface of a substrate.

Diffuser

As shown in FIG. 1, the diffuser 4 is disposed so as to oppose to the bottom surface 51 of the reflector 5 and to cover the light-distribution control element 6. In the first preferred embodiment, the diffuser 4 is disposed so as to cover the opening 53. The diffuser 4 is disposed at the light emitting surface of the planar light source apparatus 200. That is, the diffuser 4 is disposed in the +z-axis direction relative to the reflector 5. The diffuser 4 is, for example, thin plate-shaped. Alternatively, for example, the diffuser 4 is sheet-like. Alternatively, the diffuser 4 may be structured to include a transparent substrate and a diffuser film formed on the transparent substrate.

The diffuser 4 diffuses light. To "diffuse" means to spread and disperse. That is, it means to cause light to scatter. Note that, in the following description, for example, the description such as "the light rays reach the diffuser 4" is used. As described above, the diffuser 4 is disposed at the opening 53 of the reflector 5. Thus, the description "the light rays reach the diffuser 4" can translate to "the light rays reach the opening 53". Further, the opening 53 or the diffuser 4 functions as the light emitting surface of the planar light source apparatus 200. Accordingly, the description "the light rays reach the diffuser 4" can translate to "the light rays reach the light emitting surface of the planar light source apparatus 200".

Method of Manufacturing Planar Light Source Apparatus

The method of manufacturing the planar light source apparatus 200 includes the following step of preparing the light-distribution control element 6, that is, a step of manufacturing the light-distribution control element 6. In the step of preparing the light-distribution control element 6, the light-distribution control element 6 is manufactured by, for example, extrusion. More specifically, the diffusion part 6a containing the diffusing material and the light-distribution control element body 6b being higher in transparency than the diffusion part 6a are integrally molded by double extrusion molding. That is, the step of preparing the light-distribution control element 6 includes a step of forming the diffusion part 6a by double extrusion molding at least at one surface of the plurality of surfaces structuring the outer shape of the light-distribution control element 6. The at least one surface at which the diffusion part 6a is formed is, as described above, a surface different from the installation surface 63 which is capable of abutting on the main surface 81 of the holding substrate 8. In the first preferred embodiment, the diffusion part 6a is formed at the light incident surface 61.

Underlying Technology Relating to Light Distribution

Figure 5:
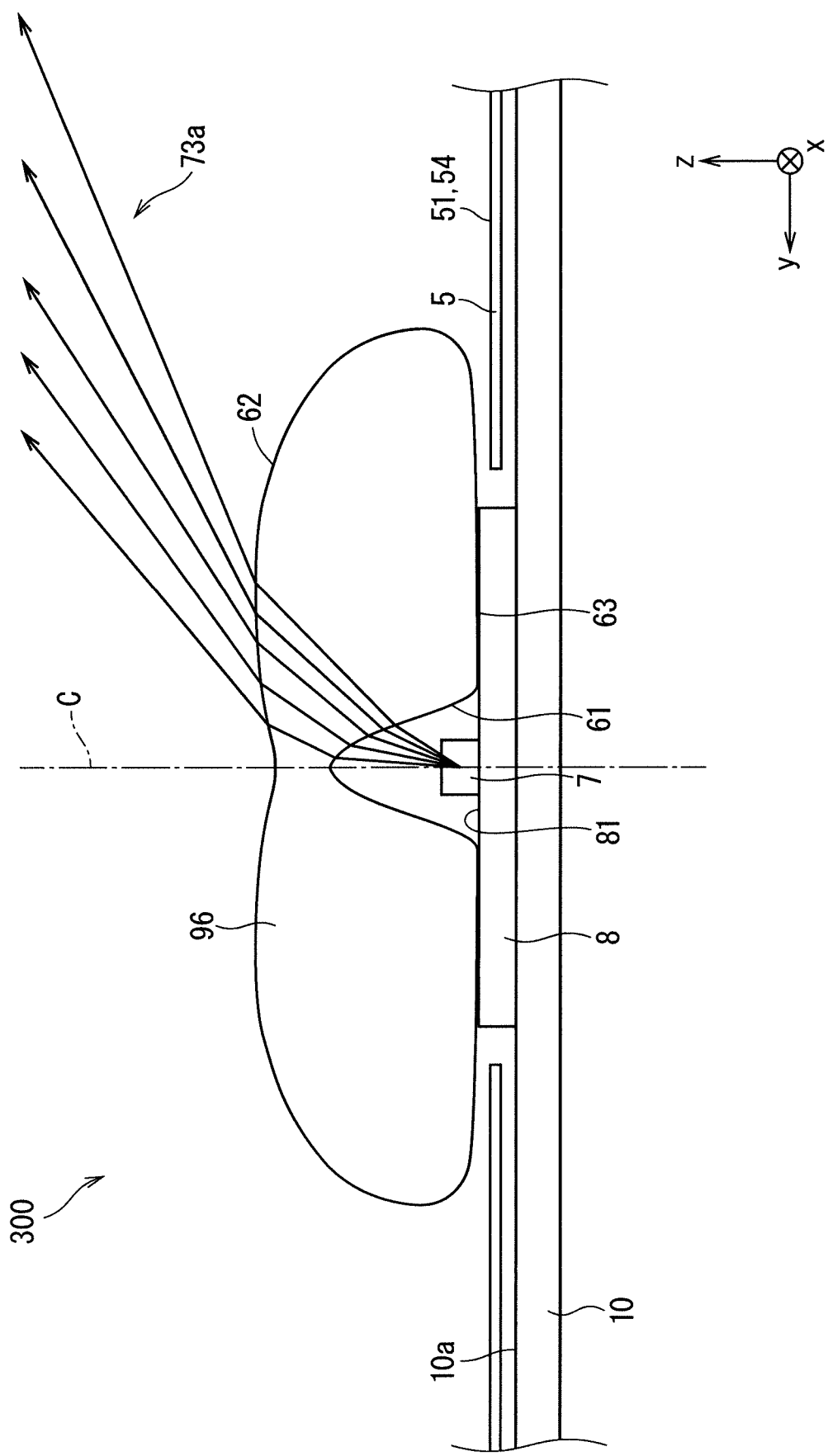

Prior to describing the operation and effect of the planar light source apparatus 200 according to the first preferred embodiment, a description will be given of the underlying technology in the present specification. Note that, the description of the underlying technology will be exemplarily given of a planar light source apparatus that does not include the diffusion part 6a. FIG. 5 is a section view showing the structure around the light source 7 included in a planar light source apparatus 300 according to the underlying technology not including the diffusion part 6a. As shown in FIG. 5, a light-distribution control element 96 included in the planar light source apparatus 300 is not provided with any diffusion part. On the other hand, the positions of the light incident surface 61, the light emitting surface 62, and the installation surface 63 in the light-distribution control element 96 are similar to those of the light incident surface 61, the light emitting surface 62, and the installation surface 63 in the light-distribution control element 6 included in the planar light source apparatus 200 shown in FIG. 2. FIG. 5 also shows part of light rays 73a that are emitted from the light source 7 in the +z-axis direction and spread just on the y-z plane. The light rays 73a are light rays that are emitted from the light source 7 at a narrow angle in the −y-axis direction relative to the optical axis C. The light rays 73a emitted from the light source 7 are refracted at the light incident surface 61, and enter inside the light-distribution control element 96. Based on the Snell laws of refraction, when a light ray becomes incident on a medium with a greater refractive index from a medium with a smaller refractive index, the angle of refraction of the light ray becomes smaller than the incident angle. Further, when a light ray becomes incident on a medium with a smaller refractive index from a medium with a greater refractive index, the angle of refraction of the light ray becomes greater than the incident angle. In the case where the light-distribution control element 96 is made of acrylic resin, as shown in FIG. 5, the light rays 73a are refracted in the −y-axis direction at the light incident surface 61. The light rays 73a propagate inside the light-distribution control element 96, to reach the light emitting surface 62. The light rays 73a are refracted in the direction in which the angle relative to the optical axis C further increases, that is, in the −y-axis direction, by the light emitting surface 62 having a convex shape.

Figure 6:
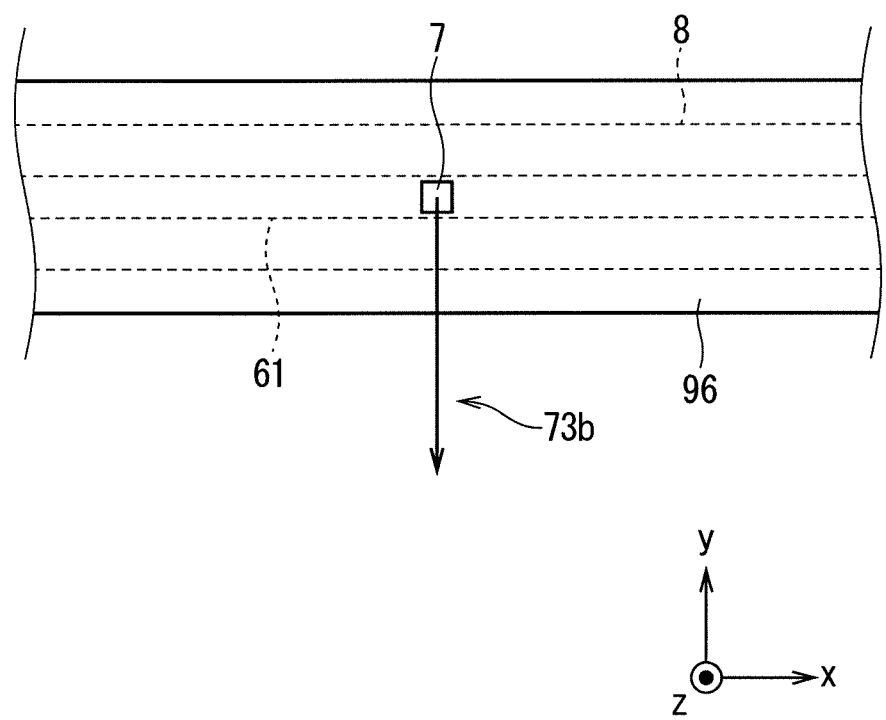

FIG. 6 is a plan view of the light-distribution control element 96, observing the x-y plane from the +z-axis direction. FIG. 6 also shows part of a light ray 73b emitted from the light source 7. Out of the light rays that are emitted from the light source 7 and spread just on the y-z plane, the light ray 73b is a light ray whose angle relative to the optical axis C is greater than the light rays 73a. The light rays that spread just on the y-z plane are the light rays that spread just in the top-bottom direction in FIG. 6.

Figure 7:
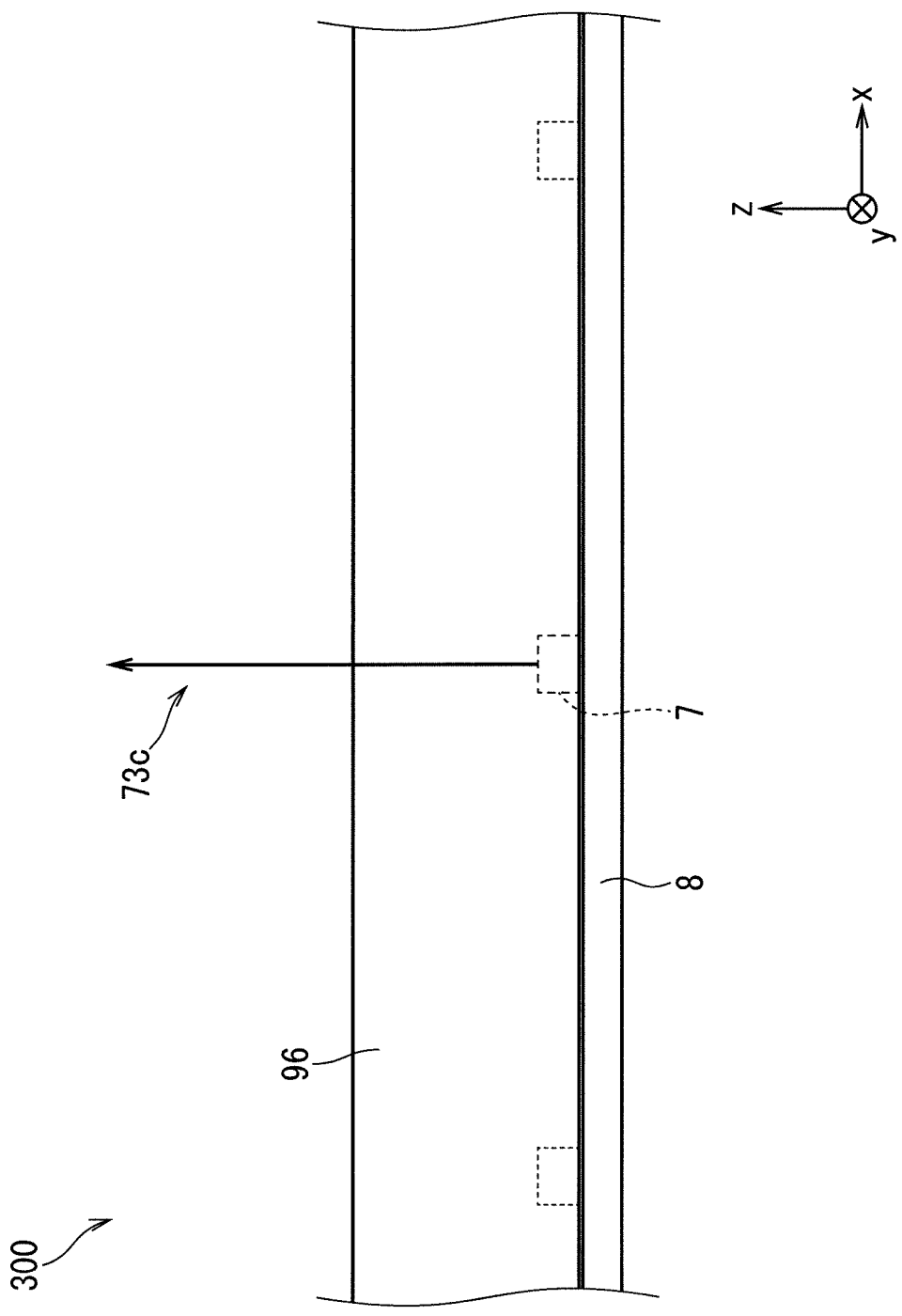

FIG. 7 is a graph showing the side surface around the light source 7 of the planar light source apparatus 300, observing the z-x plane from the −y-axis direction. FIG. 7 also shows part of a light ray 73c that is emitted from the light source 7. Out of the light rays that are emitted from the light source 7 and spread just on the y-z plane, the light ray 73c is a light ray whose angle relative to the optical axis C is greater than the light rays 73a. The light rays that spread just on the y-z plane are the light rays that spread just in the top-bottom direction in FIG. 7.

As shown in FIGS. 5 to 7, the light-distribution control element 96 diverges the light emitted from the light sources 7. The light rays 73a, the light ray 73b, or the light ray 73c emitted from the light-distribution control element 96 reach the diffuser 4 shown in FIG. 1. While the light rays are not shown, part of the light rays reaching the diffuser 4 reflect and propagate inside the container-shaped space of the reflector 5. The light rays are reflected at the bottom surface 51 or the side surface 52 of the reflector 5 and again reach the diffuser 4. The reached light is diffused while transmitting through the diffuser 4. Then, the light having transmitted through the diffuser 4 becomes even planar illumination light. The illumination light becomes incident on the rear surface 1b of the liquid crystal panel 1 through the optical sheet 3 and the optical sheet 2.

Figure 8:
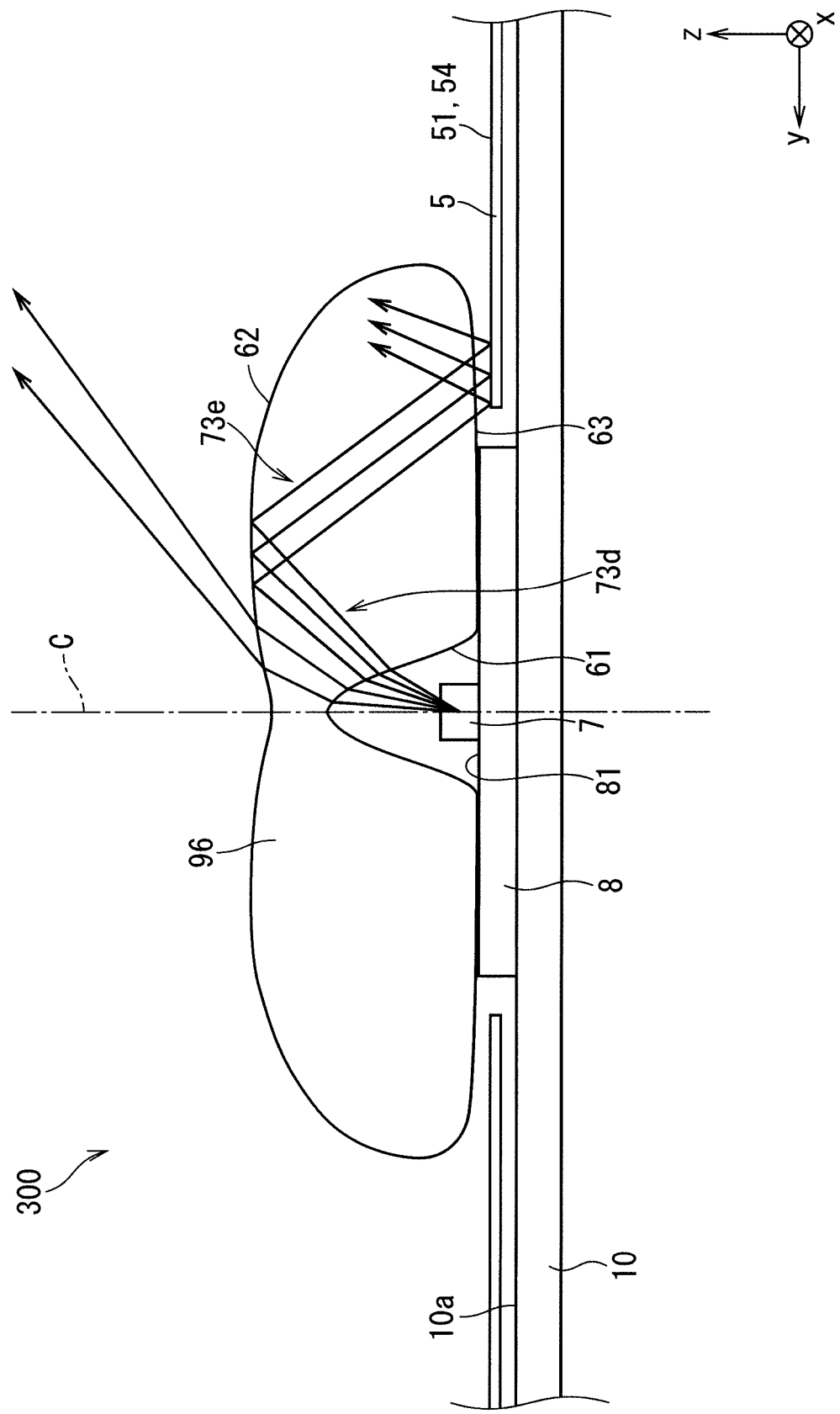

FIG. 8 is a section view showing around the light source 7 of the planar light source apparatus 300, and also shows part of light rays 73d emitted from the light source 7. The light rays 73d are different from the light rays 73a shown in FIG. 5, and include also the angular component spreading in the +x-axis direction, that is, the vector component in the +x-axis direction. Further, FIG. 9 is a plan view of the light-distribution control element 96, observing the x-y plane from the +z-axis direction. FIG. 9 also shows part of light rays 73f emitted from the light source 7. The light rays 73f have a vector component in the +x-axis direction. Note that, the light rays having the angular component spreading in the x-axis direction means light rays spreading diagonally or in parallel to the x axis in FIG. 9. The light rays 73d shown in FIG. 8 or the light rays 73f shown in FIG. 9 are greater in the incident angle relative to the light emitting surface 62 than the light rays 73a that propagate just on the y-z plane shown in FIG. 5. This is because of the vector component in the +x-axis direction being combined with the incident angle relative to the light emitting surface 62. Accordingly, the light rays having a great vector component in the +x-axis direction are likely to satisfy the total reflection condition at the light emitting surface 62.

The light rays 73e shown in FIG. 8 are, out of the light rays 73d emitted from the light source 7, light rays with greater incident angles relative to the light emitting surface 62 and which are totally reflected. The light rays 73e totally reflected at the light emitting surface 62 propagate in the −z-axis direction, and part of the light rays 73e are refracted at the installation surface 63 of the light-distribution control element 96, that is, part of the rear surface, and reach the bottom surface 51 of the reflector 5. The light rays 73e reaching the bottom surface 51 of the reflector 5 are diffuse-reflected at the reflecting surface 54. While not shown, part of the diffuse-reflected light rays again enter inside the light-distribution control element 96, and other light rays reach the diffuser 4. The light rays entering inside the light-distribution control element 96 are refracted at the light emitting surface 62 and emitted. The light rays emitted from the light emitting surface 62 reach the diffuser 4. Further, while not shown, separately from the light rays 73d or the light rays 73e, part of the light rays emitted from the light sources 7 and reflected at the light emitting surface 62 reach the main surface 81 of the holding substrate 8. The light rays are reflected at the main surface 81 of the holding substrate 8, and again enter inside the light-distribution control element 96. Then, the light rays are refracted at the light emitting surface 62 of the light-distribution control element 96 and reach the diffuser 4.

The above-described light rays emitted from the light sources 7 and reaching the diffuser 4 can be separated into two components, that is, a direct light component and a reflected light component. The direct light component is light rays, out of the light rays emitted from the light sources 7, that are refracted at the light-distribution control element 6 and thereafter directly reach the diffuser 4. The reflected light component is light rays that are reflected inside the light-distribution control element 6 and thereafter diffuse-reflected at the reflector 5, and reach the diffuser 4. The reflected light component is influenced by diffuse-reflection by the reflector 5 and, therefore, it is difficult to control the spatial distribution of such light with the light-distribution control element 6. In order to efficiently use light emitted from the light sources 7, the planar light source apparatus 200 may control distribution of light including the reflected light component. Further, in order to obtain illumination light which exhibits even luminance distribution at the light emitting surface of the planar light source apparatus 200, it is preferable to control the proportion between the direct light component and the reflected light component with the light-distribution control element 6. For example, the light-distribution control element 6 may exert control to intentionally vary the distribution of the direct light component according to the distribution of the reflected light component.

Further, as described above, recent reduction in size and increase in efficiency of the light sources 7 require the planar light source apparatus 200 to exert ever higher light distribution control. In connection therewith, there exists increasing demand for higher disposition precision of the light sources 7 and the light-distribution control element 6 considered to be essential for the planar light source apparatus 200. Further, there also exists increasing demand for higher disposition precision of the optical component that spreads the light rays emitted from the light sources 7, and shape precision of the optical members. That is, there also exists increasing demand for higher surface shape precision of the light incident surface 61 of the light-distribution control element 6 and the light emitting surface 62. In the case where the light-distribution control element 6 is manufactured by extrusion, the shape precision that can be managed in the manufacturing process may fail to satisfy the required specification. As has been described above, the degree of difficulty in manufacturing the light-distribution control element 6, and consequently in manufacturing the planar light source apparatus 200, have been increasing recent years.

Operation of Diffusion Part

Figure 10:
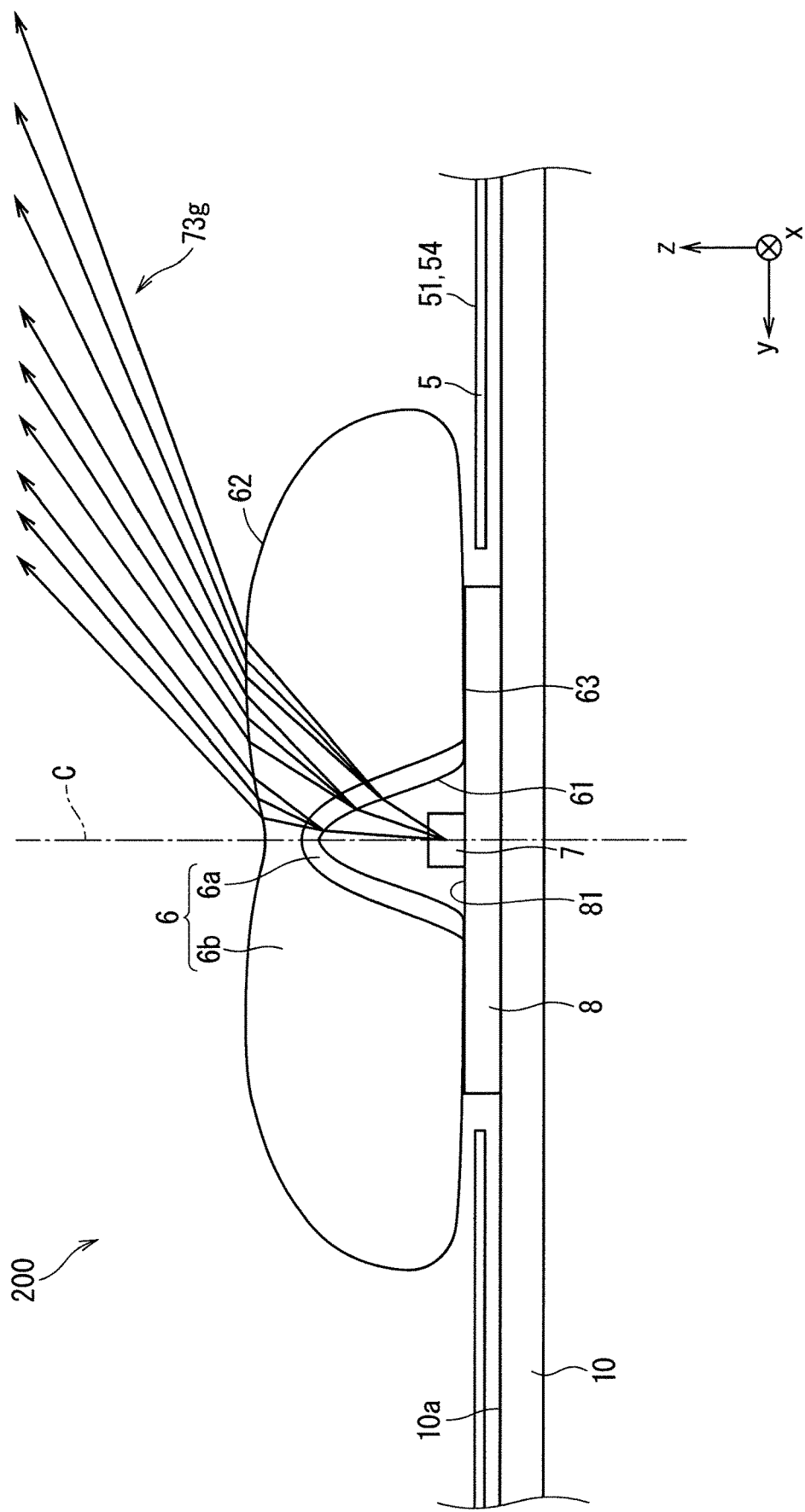
FIG. 10 is a diagram showing the structure around the light source of the planar light source apparatus according to the first preferred embodiment and light rays emitted from the light source.

FIG. 10 is a diagram showing the structure around the light source 7 included in the planar light source apparatus 200 according to the first preferred embodiment. FIG. 10 also shows part of light rays 73g emitted from the light source 7. As described above, the planar light source apparatus 200 includes the diffusion part 6a at the light incident surface 61 of the light-distribution control element 6. The light rays 73g emitted from the light source 7 and becoming incident on the diffusion part 6a of the light incident surface 61 are diffused by the diffusing material contained in the diffusion part 6a, and change their traveling directions. Note that, the degree of diffusion of the light rays 73g attained by the diffusion part 6a is smaller as compared to the degree of refraction of the light rays 73g at the light incident surface 61 or the light emitting surface 62. That is, in the diffusion part 6a, while the light rays 73g have their traveling directions changed in random directions, multiple scattering enough to cancel the effect of light distribution control by the light incident surface 61 and the light emitting surface 62 will not occur.

The distributed light is directed to the light emitting surface of the planar light source apparatus 200, that is, the diffuser 4, by the refraction which is dependent on the surface shape of the light incident surface 61 and the light emitting surface 62 of the light-distribution control element 6. When scattering of light by the diffusing material becomes dominant over refraction, it becomes difficult to refract and distribute the light rays 73g as intended at the light incident surface 61 and the light emitting surface 62 of the light-distribution control element 6. For example, when the light scattering effect by the diffusing material of the diffusion part 6a increases, the luminance of the planar light source apparatus 200 may become higher near the position where the light sources 7 are disposed, and may become lower as farther from the light sources 7. In the first preferred embodiment, the diffusion part 6a has the thickness or the concentration of the diffusing material with which the degree of diffusion of the light rays 73g attained by the diffusion part 6a becomes smaller as compared to the degree of refraction of the light rays 73g at the light incident surface 61 or the light emitting surface 62. Accordingly, the light scattering attained by the diffusion part 6a will not become dominant.

The light rays 73g shown in FIG. 10 schematically represent the manner of diffusion, that is, scattering, of light rays becoming incident on the diffusion part 6a. The light rays 73g emitted from the light source 7 are refracted at the light incident surface 61, and become incident on the diffusion part 6a. Note that, in FIG. 10, while the light rays 73g becoming incident on the diffusion part 6a are represented by three lines, each of the light rays 73g includes three light rays that travel through a substantially identical optical path. That is, the light rays 73g shown in FIG. 10 consist of nine light rays in total. The light rays 73g that propagate through a substantially identical optical path and becoming incident on the diffusion part 6a have their traveling direction changed in random directions by the diffusing material contained in the diffusion part 6a. The diffused light rays 73g reach the light emitting surface 62 of the light-distribution control element 6 while substantially maintaining the refracted directions at the light incident surface 61. The light rays 73g emitted from the light emitting surface 62 illuminate a wider area as compared to the case where no diffusion part 6a is provided, that is, as compared to the underlying technology. Hence, the evenness of the planar light improves.

Further, by the diffusion part 6a, the light rays 73g travel light propagation paths that are independent of the surface shape of the light incident surface 61 and the light emitting surface 62 of the light-distribution control element 6. In the case where the light-distribution control element 6 is misaligned from a predetermined position relative to the light sources 7, while the incident angle and the emission angle of the light rays at the light incident surface 61 deviate from the design value, the diffusion part 6a alleviates the deviation. The same holds true for the case where the shape precision of the light incident surface 61 of the light-distribution control element 6 does not satisfy the required precision, and the diffusion part 6a alleviates the adverse effect. In this manner, the diffusion part 6a can decrease the sensitivity of the light rays 73g to the surface shape precision and the disposition precision. In other words, the diffusion part 6a provides allowance to the surface shape precision and the disposition precision of the light-distribution control element 6. As a result, the luminance distribution at the irradiated surface of the planar light source apparatus 200 stabilizes.

Effect

As described above, the light rays 73g emitted from the light emitting surface 62 illuminate a wider are as compared to the case where no diffusion part 6a is provided, that is, as compared to the underlying technology. Hence, the evenness of the planar light improves. Further, the diffusion part 6a provides allowance to the surface shape precision and the disposition precision of the light-distribution control element 6. Hence, the luminance distribution at the irradiated surface of the planar light source apparatus 200 stabilizes.

In summary, the planar light source apparatus 200 according to the first preferred embodiment includes the light source 7, the holding substrate 8 that holds the light source 7 at the main surface 81, and the light-distribution control element 6 that is disposed at the main surface 81 of the holding substrate 8 so as to cover the light source 7, and changes distribution of light emitted from the light source 7. The light-distribution control element 6 includes the diffusion part 6a that is provided at at least one surface of the plurality of surfaces structuring the outer shape of the light-distribution control element 6. The at least one surface where the diffusion part 6a is provided is a surface different from the installation surface 63 capable of abutting on the main surface 81 of the holding substrate 8.

With the structure described above, the planar light source apparatus 200 can improve evenness of planar light using both the light rays transmitted through the light emitting surface 62 of the light-distribution control element 6, and the light rays reflected at the light emitting surface 62. Further, this structure improves robustness during manufacture in relation to disposition of the light-distribution control element 6 and the holding substrate 8, or disposition of the light-distribution control element 6 and the light source 7. Further, the degree of diffusion of the light rays 73g attained by the diffusion part 6a can be adjusted by the thickness of the diffusion part 6a. It becomes possible to adjust so that the degree of diffusion of the light rays 73g attained by the diffusion part 6a becomes smaller as compared to the degree of refraction of the light rays attained by the light incident surface 61 or the light emitting surface 62.

Further, the planar light source apparatus 200 emits planar light with highly even luminance distribution and, accordingly, the planar light source apparatus 200 can be used not just as the backlight of the liquid crystal display apparatus 100 but also as, for example, an illumination apparatus used for illuminating a room or the like. Further, the planar light source apparatus 200 can be used as, for example, an advertisement display apparatus in which a picture or the like is illuminated from the rear surface side. Note that, the liquid crystal display apparatus 100 including the planar light source apparatus 200 shown in the preferred embodiment is merely an example. The similar effect can be exhibited by a display apparatus that includes a display panel being different in type from the liquid crystal panel 1 and the planar light source apparatus 200, in which the planar light source apparatus 200 illuminates the display panel.

Further, in the first preferred embodiment, the plurality of surfaces being a surface different from the installation surface 63 include the light incident surface 61 that is positioned so as to cover the light sources 7 and on which the light rays 73g emitted from the light sources 7 become incident, and the light emitting surface 62 from which the light rays 73g becoming incident on the light incident surface 61 are emitted. The at least one surface where the diffusion part 6a is provided is the light incident surface 61. Since the light incident surface 61 is near to the light sources 7, a multitude of light rays emitted from the light sources 7 transmit through the light incident surface 61. The diffusion part 6a provided at the light incident surface 61 scatters a great amount of light emitted from the light sources 7. Further, by virtue of the diffusion part 6a being formed at the light incident surface 61 which is smaller in area than the light emitting surface 62, the light-distribution control element 6 can be obtained at lower costs.

Further, in the first preferred embodiment, the light source 7 includes the plurality of light sources that are discretely arranged in a row at the main surface 81 of the holding substrate 8. The longitudinal direction of the light-distribution control element 6 is in the arrangement direction of the light sources 7. The light incident surface 61 extends in the longitudinal direction and includes a concave curved surface or a flat surface that covers the plurality of light sources. The light emitting surface 62 includes a convex cylindrical surface in the plane perpendicular to the longitudinal direction. The diffusion part 6a extends in the longitudinal direction. With such a structure, the planar light source apparatus 200 can include the light-distribution control element 6 by the number smaller than the number of the light sources 7. That is, the planar light source apparatus 200 can reduce the number of the employed light-distribution control element 6. Further, the attaching process thereof simply includes fixing the light-distribution control element 6 being smaller in number than the light sources 7 to the light sources 7 arranged in a row and, therefore, the attaching work is easy. Further, the bar-like light-distribution control element 6 can be manufactured by extrusion, which makes it possible to reduce the manufacturing costs of the planar light source apparatus 200.

Note that, the light-distribution control element 6 is not limited to an optical element that is bar-shaped in the longitudinal direction of the light sources 7. A planar light source apparatus exhibits the effect similar to that exhibited by the first preferred embodiment, for example, when one light-distribution control element such as a hemispheric lens is attached to one light source. However, with the planar light source apparatus including individual light-distribution control elements for the light sources, the number of installed light-distribution control elements increases. Further, in the manufacturing process thereof, the light-distribution control elements (lenses) may be fixed to the light sources, respectively, and hence the number of steps increases.

Further, the planar light source apparatus 200 according to the first preferred embodiment further includes the reflector 5. The reflector 5 includes the opening 53 in which the diffuser 4 is provided, and the reflecting surface 54. Further, the reflector 5 has a container shape capable of housing the light sources 7 and the light-distribution control element 6. The reflecting surface 54 is disposed inside the container shape, and reflects light emitted from the light-distribution control element 6. The opening 53 emits the light emitted from the light-distribution control element 6 and the light reflected at the reflecting surface 54 via the diffuser 4. With such a structure, the planar light source apparatus 200 emits planar light with further improved evenness.

Further, the diffusion part 6a included in the planar light source apparatus 200 according to the first preferred embodiment is formed by the light-distribution control element 6 containing a diffusing material. With such a structure, the degree of diffusion of the light rays 73g attained by the diffusion part 6a can be adjusted by the concentration of the diffusing material in the diffusion part 6a. The degree of diffusion of the light rays 73g attained by the diffusion part 6a can be adjusted to be smaller as compared to the degree of refraction of light rays at the light incident surface 61 or the light emitting surface 62.

Further, the diffusion part 6a included in the planar light source apparatus 200 according to the first preferred embodiment is provided at the front surface of the at least one surface to include a smooth surface. The at least one surface is one of the plurality of surfaces that structure the outer shape of the light-distribution control element 6. With such a structure, the diffusion part 6a can be integrally formed with the light-distribution control element body 6b by double extrusion molding.

Further, the thickness distribution of the diffusion part 6a of the planar light source apparatus 200 according to the first preferred embodiment is even. With such a structure, the planar light source apparatus 200 can evenly distribute light irrespective of the shape precision of the surface where the diffusion part 6a is provided, or the disposition precision of the light-distribution control element 6 relative to the light sources 7.

The light-distribution control element 6 included in the planar light source apparatus 200 according to the first preferred embodiment further includes the light-distribution control element body 6b being higher in transparency than the diffusion part 6a. The diffusion part 6a and the light-distribution control element body 6b are integrated with each other. With such a structure, the positional relationship between the diffusion part 6a and the light-distribution control element body 6b stabilizes. Relative to the positions of the light sources 7, the diffusion part 6a or the light-distribution control element body 6b can be positioned at once. Further, the light-distribution control element 6 that includes the diffusion part 6a and the light-distribution control element body 6b can be manufactured by double molding, which makes it possible to reduce the manufacturing costs of the planar light source apparatus 200.

A display apparatus according to the first preferred embodiment is the liquid crystal display apparatus 100. The liquid crystal display apparatus 100 includes the planar light source apparatus 200 and a display panel that converts planar light emitted from the planar light source apparatus 200 into image light. The display panel is the liquid crystal panel 1. Since the liquid crystal panel 1 is illuminated with the light with improved evenness by the planar light source apparatus 200, the liquid crystal display apparatus 100 realizes higher image quality than the conventional technique.

A method of manufacturing the planar light source apparatus 200 according to the first preferred embodiment includes a step of preparing the light-distribution control element 6. The step of preparing the light-distribution control element 6 includes a step of forming the diffusion part 6a by double extrusion molding at least at one surface of the plurality of surfaces structuring the outer shape of the light-distribution control element 6. The at least one surface where the diffusion part 6a is formed is a surface different from the installation surface 63 capable of abutting on the main surface 81 of the holding substrate 8. The at least one surface is, in the first preferred embodiment, the light incident surface 61. According to the method of manufacturing the planar light source apparatus 200 having such a structure, the diffusion part 6a is integrally molded with the light-distribution control element 6 and, therefore, the position of the diffusion part 6a in the light-distribution control element 6 stabilizes. For example, relative to the positions of the light sources 7, the diffusion part 6a or the light-distribution control element body 6b can be positioned at once. Further, the manufacturing costs of the planar light source apparatus 200 can be reduced.

Further, according to the method of manufacturing the light-distribution control element 6 by extrusion, the length of the light-distribution control element 6 can be freely changed. For example, in the case where the size of the liquid crystal display apparatus 100 is different, the light-distribution control element 6 having just its length changed can be manufactured using the same mold assembly, and installed on the planar light source apparatus 200. Further, similarly, any change in the mold assembly for fabricating the light-distribution control element 6 is not necessary when the number of installed light sources 7 increases or reduces. For example, when the installed light sources 7 are increased in number in order to improve luminance, each of light sources 7 can be covered with the same light-distribution control element 6. That is, with the planar light source apparatus 200, luminance can be adjusted just by changing the number of the installed light sources 7. The light-distribution control element 6 manufactured by extrusion makes it possible to fabricate the planar light source apparatus 200 with the light sources 7 being optimum in the number and the disposition. Thus, the light-distribution control element 6 manufactured by extrusion is flexible about changes in the specification of the planar light source apparatus 200.

Modification of First Preferred Embodiment

A description will be given of a planar light source apparatus according to a modification of the first preferred embodiment. The description of the structure similar to that in the first preferred embodiment will not be repeated.

Figure 11:
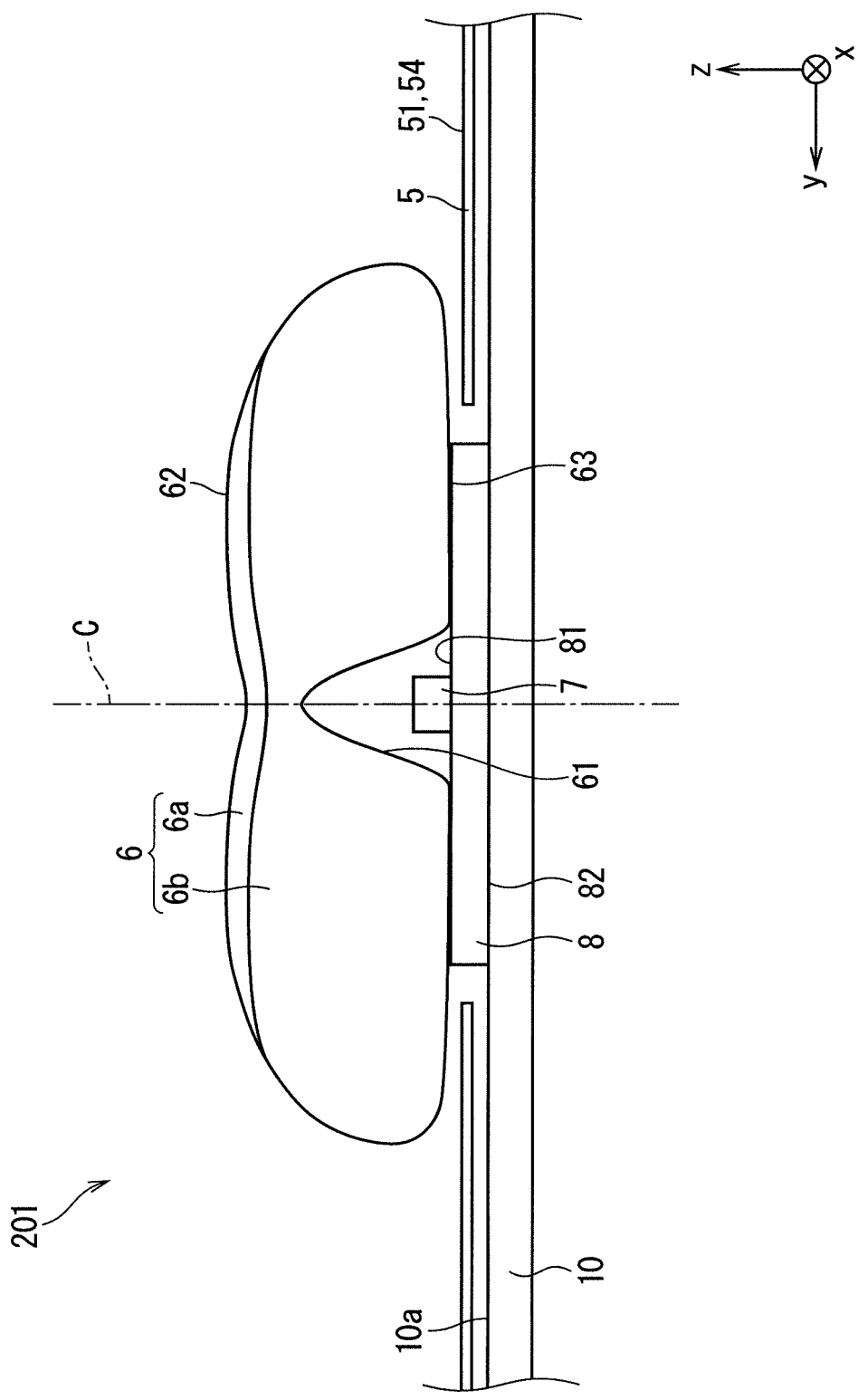
FIG. 11 is a section view showing the structure around the light source of the planar light source apparatus according to a modification of the first preferred embodiment.

FIG. 11 is a diagram showing the structure around the light source 7 of a planar light source apparatus 201 according to a modification of the first preferred embodiment. In the present modification, the at least one surface where the diffusion part 6a is provided is the light emitting surface 62. The diffusion part 6a is formed along a front surface of the light emitting surface 62. While the diffusion part 6a shown in FIG. 11 is provided on the upper surface side (the +z-axis direction) of the light emitting surface 62, the diffusion part 6a may be provided so as to cover also the side surface (the surface in the y-axis direction). Further, the light-distribution control element body 6b being integrated with the diffusion part 6a includes the light incident surface 61 and the installation surface 63 in the present modification.

The planar light source apparatus 201 having such a structure exhibits the optical effect similar to that exhibited by the planar light source apparatus 200 according to the first preferred embodiment. Further, since the light emitting surface 62 is greater in area than the light incident surface 61, the diffusion part 6a is formed easily.

While not shown in the drawing, the diffusion part 6a may be formed along both the light incident surface 61 and the light emitting surface 62. The planar light source apparatus having such a structure also exhibits the effect similar to that described above.

Second Preferred Embodiment

A description will be given of a planar light source apparatus according to a second preferred embodiment. The description of the structure similar to that in the first preferred embodiment will not be repeated.

Figure 12:
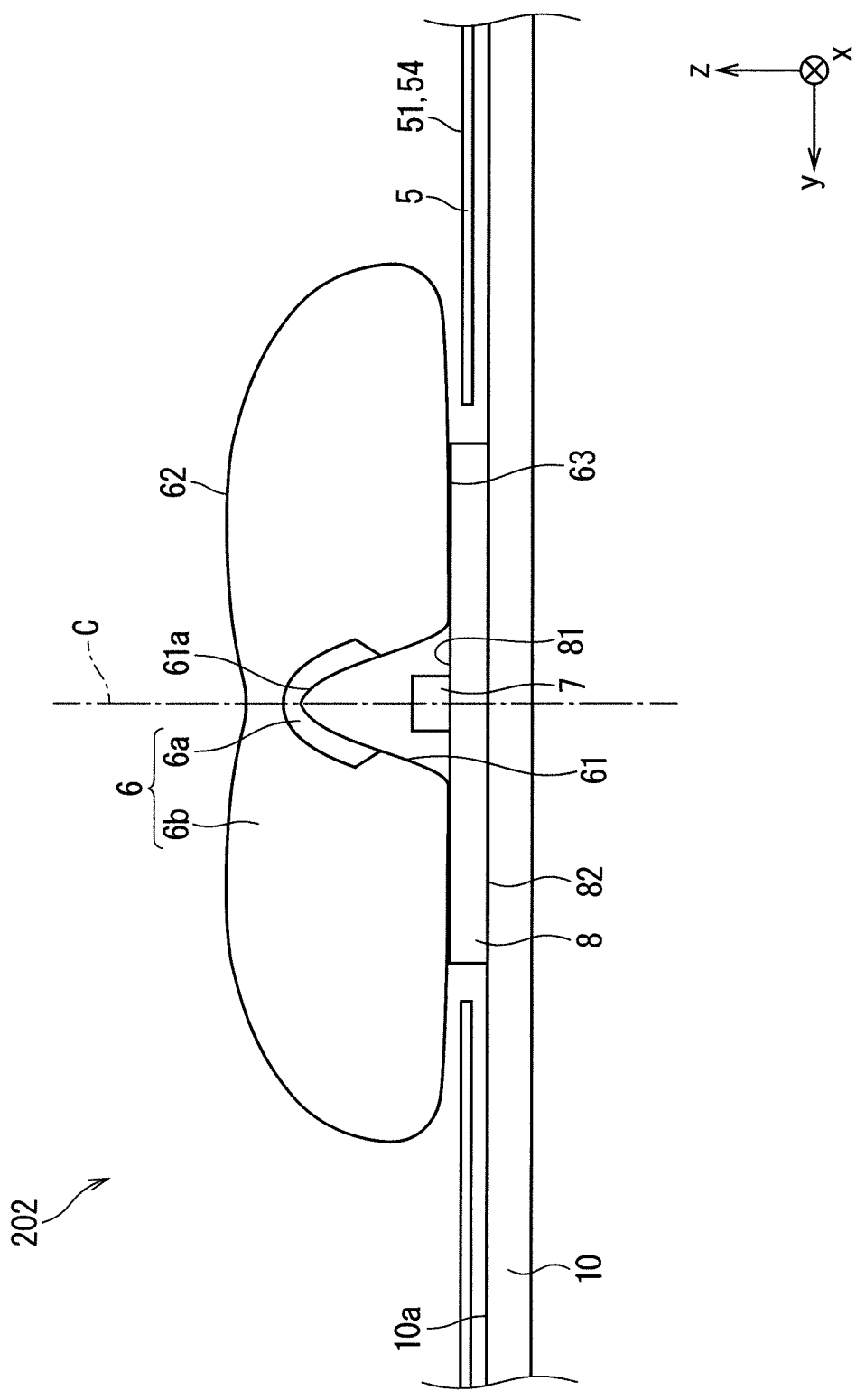
FIG. 12 is a section view showing the structure around light source of a planar light source apparatus according to a second preferred embodiment.

FIG. 12 is a diagram showing the structure around the light source 7 of a planar light source apparatus 202 according to the second preferred embodiment. The diffusion part 6a is provided at a partial region 61a in the light incident surface 61. That is, in the second preferred embodiment, the diffusion part 6a is provided at the partial region 61a at the front surface of at least one of the plurality of surfaces structuring the outer shape of the light-distribution control element 6.

The density of light rays becoming incident on the light incident surface 61 of the light-distribution control element 6, that is, the light intensity per unit area, differs among the sites in the light incident surface 61. The required precision in the surface shape depends on the density of light rays. The diffusion part 6a according to the second preferred embodiment is provided at the partial region 61a corresponding to the site where high surface shape precision is required. For example, in the case where higher surface shape precision than surrounding is required for a site being higher in the density of light rays than the surrounding site, the partial region 61a of the light incident surface 61 where the diffusion part 6a is provided is higher in the density of light rays passing therethrough than the surrounding region.

In the planar light source apparatus 202 including such a structure, robustness in relation to disposition of the light-distribution control element 6 and the holding substrate 8, or disposition of the light-distribution control element 6 and the light sources 7 improves. Further, the amount of the diffusing material used in the diffusion part 6a can be reduced, whereby the manufacturing costs of the light-distribution control element 6 are reduced.

Similarly, the density of light rays becoming incident on the light emitting surface 62 differs among the sites in the light emitting surface 62. While not shown in the drawing, a planar light source apparatus in which the diffusion part is provided at the partial region where the density of light rays is high in the light emitting surface 62 exhibits the effect similar to that exhibited by the second preferred embodiment.

Third Preferred Embodiment

A description will be given of a planar light source apparatus according to a third preferred embodiment. The description of the structure similar to that in the first preferred embodiment will not be repeated.

Figure 13:
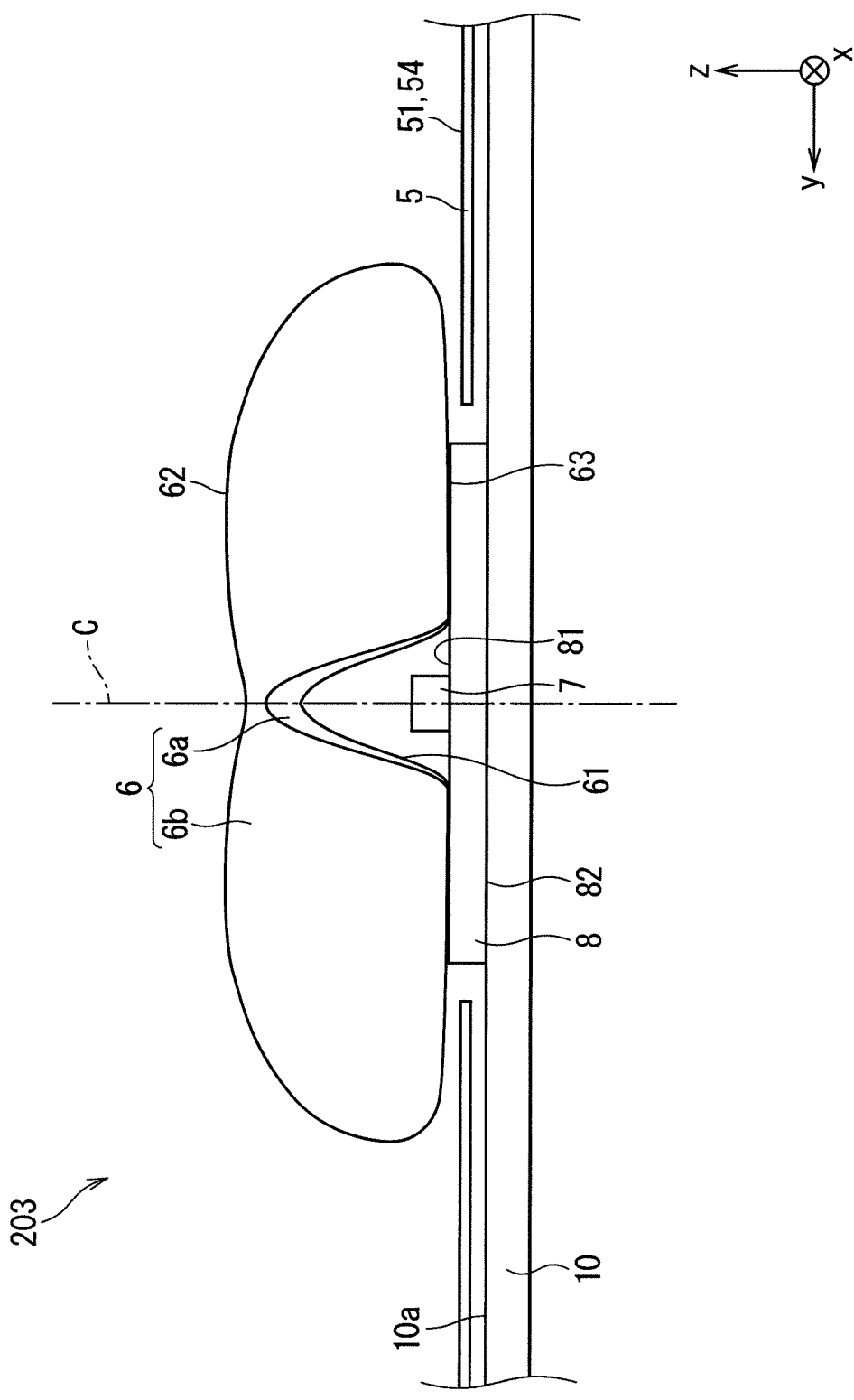
FIG. 13 is a section view showing the structure around light source of a planar light source apparatus according to a third preferred embodiment.

FIG. 13 is a diagram showing the structure around the light source 7 of a planar light source apparatus 203 according to the third preferred embodiment. In the third preferred embodiment, similarly to the first preferred embodiment, the diffusion part 6a is formed along the light incident surface 61 of the light-distribution control element 6. Note that, the thickness distribution of the diffusion part 6a according to the third preferred embodiment is uneven. That is, the thickness of the diffusion part 6a differs among the in-plane positions of the light incident surface 61. The thickness distribution of the diffusion part 6a corresponds to the distribution of density of light rays transmitting through the light incident surface 61.

The density of light rays becoming incident on the light incident surface 61 of the light-distribution control element 6 differs among the sites in the light incident surface 61. The required precision in the surface shape depends on the density of light rays. The thickness of the diffusion part 6a is great in the region corresponding to the site where high surface shape precision is required, and small in the region where the required surface shape precision is low. For example, in the case where high surface shape precision is required for a site being higher in density of light rays than the surrounding site, the thickness of the diffusion part 6a is greater at such site than at the surrounding site. On the other hand, the thickness of the diffusion part 6a is smaller than the surrounding site at a site where the density of light rays is lower than the surrounding site. In the planar light source apparatus 203 including such a structure, robustness in relation to disposition of the light-distribution control element 6 and the holding substrate 8, or disposition of the light-distribution control element 6 and the light sources 7 improves. Further, since the diffusion part 6a is provided efficiently, the use amount of the diffusing material is reduced and hence costs are reduced.

Similarly, the density of light rays becoming incident on the light emitting surface 62 differs among the sites in the light emitting surface 62. While not shown in the drawing, a planar light source apparatus including the diffusion part having thickness distribution corresponding to the distribution of the density of light rays in the light emitting surface 62 exhibits the effect similar to that exhibited by the third preferred embodiment.

Fourth Preferred Embodiment

A description will be given of a planar light source apparatus according to a fourth preferred embodiment. The description of the structure similar to that in any of the first to third preferred embodiments will not be repeated.

Structure

Figure 14:
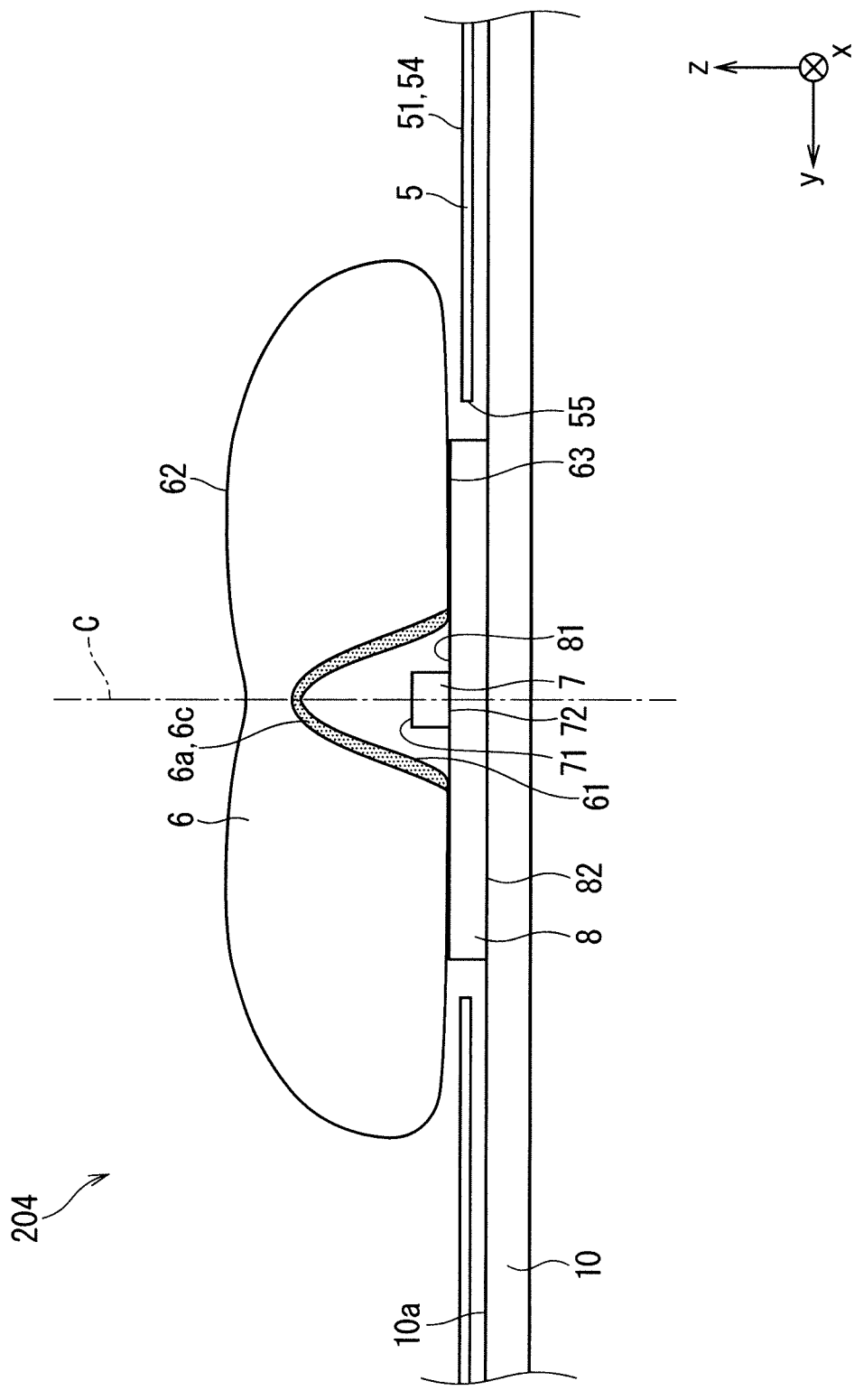
FIG. 14 is a section view showing the structure around light source of a planar light source apparatus according to a fourth preferred embodiment.
Figure 15:
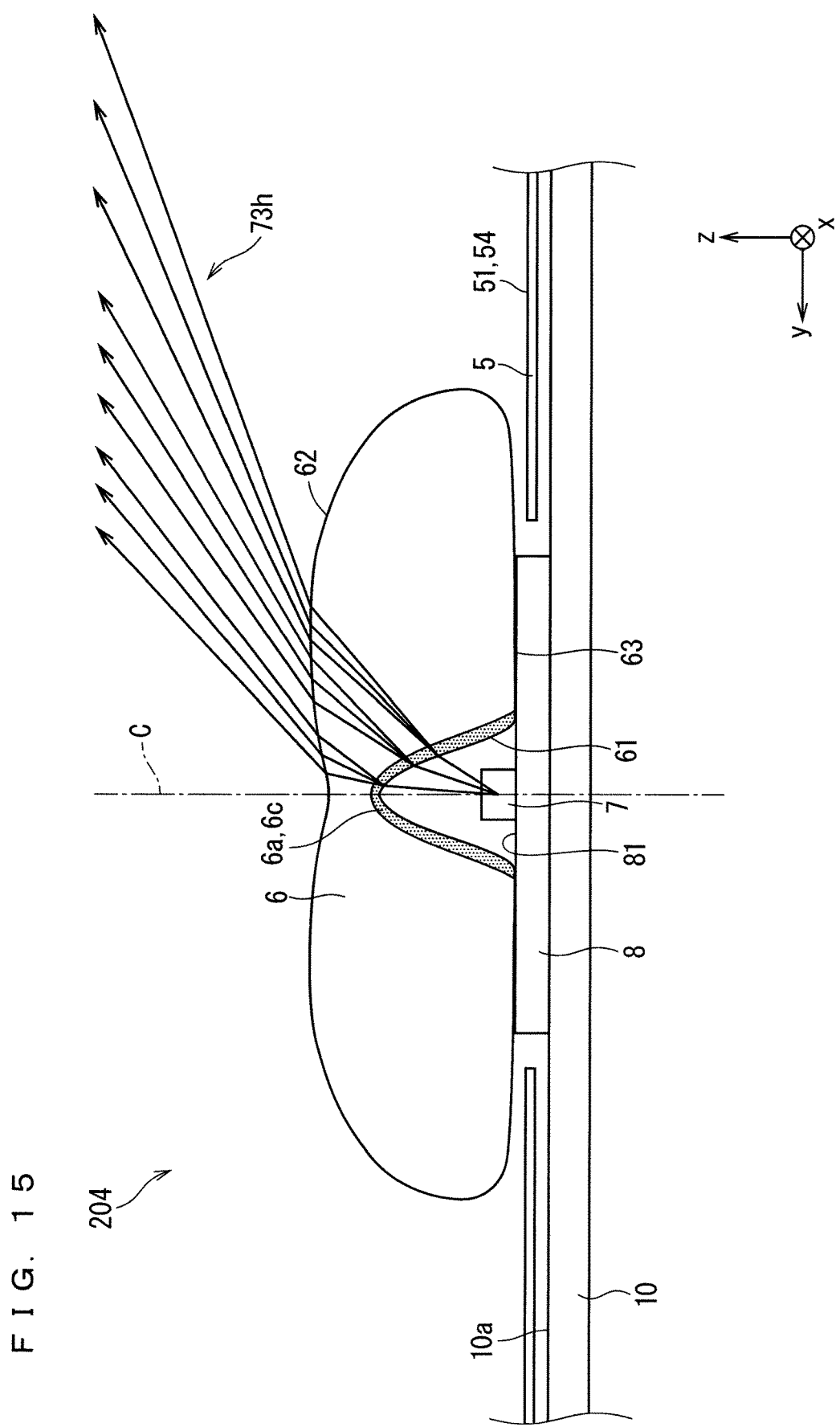
FIG. 15 is a diagram showing the structure around the light source of the planar light source apparatus according to the fourth preferred embodiment and light rays emitted from the light source.

FIG. 14 is a diagram showing the structure around the light source 7 of a planar light source apparatus 204 according to the fourth preferred embodiment. The light-distribution control element 6 includes the diffusion part 6a at least at one surface of the plurality of surfaces structuring the outer shape of the light-distribution control element 6. The diffusion part 6a is provided at a front surface of the at least one surface, and includes a rough surface structure 6c. In the present embodiment, the diffusion part 6a is the rough surface structure 6c. The rough surface structure 6c is a micro structure having recesses and projections. FIG. 15 does not show the height and intervals of the recesses and projections of the rough surface structure 6c. The curvature of the concave-shaped light incident surface 61 is greater than the recesses and projections of the rough surface structure 6c. Further, the curvature of the convex-shaped light emitting surface 62 is greater than the recesses and projections of the rough surface structure 6c. The rough surface structure 6c scatters or diffracts light rays emitted from the light sources 7. In the rough surface structure 6c, the recesses and projections have intervals or height with which the degree of scattering or diffraction of light attained by the rough surface structure 6c becomes smaller as compared to the degree of refraction of the light rays at the light incident surface 61 or the light emitting surface 62. That is, the rough surface structure 6c will not cancel the effect of the light distribution control exhibited by the light incident surface 61 or the light emitting surface 62.

The at least one surface where the rough surface structure 6c is formed as the diffusion part 6a is a surface different from the installation surface 63. In the fourth preferred embodiment, the rough surface structure 6c is formed along the light incident surface 61. The rough surface structure 6c extends in the longitudinal direction of the light-distribution control element 6. Note that, while the rough surface structure 6c shown in FIG. 15 is formed over the entire light incident surface 61, the rough surface structure 6c may be formed at part of the light incident surface 61. Other than the structure of the light-distribution control element 6, the structure of the planar light source apparatus 204 is identical to the planar light source apparatus 200 according to the first preferred embodiment.

Method of Manufacturing Planar Light Source Apparatus

A method of manufacturing the planar light source apparatus 204 includes the following step of preparing the light-distribution control element 6, that is, a step of manufacturing the light-distribution control element 6. In the step of preparing the light-distribution control element 6, the light-distribution control element 6 is manufactured by, for example, extrusion. The front surface of the at least one surface of the plurality of surfaces structuring the outer shape of the light-distribution control element 6 is subjected to a roughening process, to form the rough surface structure 6c. The at least one surface where the rough surface structure 6c is formed is a surface different from the installation surface 63 capable of abutting on the main surface 81 of the holding substrate 8. In the fourth preferred embodiment, the rough surface structure 6c is formed at the light incident surface 61.

The roughening process includes a step of grinding the light incident surface 61. For example, the light incident surface 61 is subjected to friction when the light-distribution control element 6 undergoes extrusion. Alternatively, the roughening process includes a step of performing sand blasting on the light incident surface 61 after the light-distribution control element 6 is molded.

Operation of Rough Surface Structure

FIG. 15 is a diagram showing the structure around the light source 7 included in the planar light source apparatus 204 according to the fourth preferred embodiment. FIG. 15 also shows part of light rays 73h emitted from the light source 7. The light rays 73h emitted from the light source 7 and becoming incident on the rough surface structure 6c of the light incident surface 61 reach the rough surface structure 6c, and change their directions by being scattered or diffracted. Note that, the degree of the scattering or diffraction of the light rays 73h attained by the rough surface structure 6c is smaller than the degree of refraction of the light rays 73h at the light incident surface 61 or the light emitting surface 62. That is, while the light rays 73h have their respective traveling directions changed in random directions at the rough surface structure 6c, multiple scattering or multiple diffraction enough to cancel the effect of the light distribution control exhibited by the light incident surface 61 or the light emitting surface 62 will not occur.

By the refraction which is dependent on the surface shape of the light incident surface 61 and the light emitting surface 62 of the light-distribution control element 6, the distributed light is directed to the light emitting surface of the planar light source apparatus 204, that is, to the diffuser 4. When the scattering of light by the rough surface structure 6c becomes dominant over refraction, the light-distribution control element 6 can hardly refract and distribute the light rays 73h in a designed manner with the light incident surface 61 and the light emitting surface 62. For example, when the light scattering effect by the rough surface structure 6c becomes great, the luminance of the planar light source apparatus 204 may become higher near the light sources 7 and lower as becoming farther from the light sources 7. In the fourth preferred embodiment, the rough surface structure 6c has intervals and height with which the scattering or diffraction of light attained by the rough surface structure 6c becomes smaller as compared to the degree of refraction of the light rays at the light incident surface 61 or the light emitting surface 62. Accordingly, scattering of light at the rough surface structure 6c will not become dominant.

The light rays 73h shown in FIG. 15 schematically show the manner of scattering of the light rays becoming incident on the rough surface structure 6c. The light rays 73h emitted from the light source 7 are refracted at the light incident surface 61, and become incident on the rough surface structure 6c. Note that, in FIG. 15, while the light rays 73h becoming incident on the rough surface structure 6c are represented by three lines, each of the light rays 73h includes three light rays that travel through a substantially identical optical path. Hence, the light rays 73h shown in FIG. 15 consist of nine light rays in total. The light rays 73h that propagate through a substantially identical optical path and becoming incident on have their traveling directions changed in random directions by the rough surface structure 6c. The light rays 73h that are scattered or diffracted reach the light emitting surface 62 of the light-distribution control element 6 while substantially maintaining the refracted directions at the light incident surface 61. The light rays 73h emitted from the light emitting surface 62 illuminate a wider area as compared to the case where no rough surface structure 6c is provided, that is, as compared to the underlying technology. Hence, the evenness of the planar light improves.

Further, by the rough surface structure 6c, the light rays 73h travel light propagation paths that are independent of the surface shape of the light incident surface 61 and the light emitting surface 62 of the light-distribution control element 6. In the case where the light-distribution control element 6 is misaligned from a predetermined position relative to the light sources 7, while the incident angle and the emission angle of the light rays at the light incident surface 61 deviate from the design value, the rough surface structure 6c alleviates the deviation. The same holds true for the case where the shape precision of the light incident surface 61 of the light-distribution control element 6 does not satisfy the required precision, and the rough surface structure 6c alleviates the adverse effect. In this manner, the rough surface structure 6c decrease the sensitivity of the light rays 73h to the surface shape precision and the disposition precision. In other words, the rough surface structure 6c provides allowance to the surface shape precision and the disposition precision of the light-distribution control element 6. As a result, the luminance distribution at the irradiated surface of the planar light source apparatus 204 stabilizes.

Effect

As described above, the light rays 73h emitted from the light emitting surface 62 illuminate a wider area as compared to the case where no rough surface structure 6c is provided, that is, as compared to the underlying technology. Hence, the evenness of the planar light improves. Further, the rough surface structure 6c provides allowance to the surface shape precision and the disposition precision of the light-distribution control element 6. Hence, the luminance distribution at the irradiated surface of the planar light source apparatus 204 stabilizes.

In summary, the diffusion part 6a of the planar light source apparatus 204 according to the fourth preferred embodiment is provided at at least one surface of the plurality of surfaces structuring the outer shape of the light-distribution control element 6. The diffusion part 6a is provided at the front surface of the at least one surface to include rough surface structure 6c.

With such a structure, the planar light source apparatus 204 can improve evenness of planar light using both the light rays transmitted through the light emitting surface 62 of the light-distribution control element 6 and the light rays reflected at the light emitting surface 62. Further, this structure improves robustness during manufacture in relation to disposition of the light-distribution control element 6 and the holding substrate 8, or disposition of the light-distribution control element 6 and the light sources 7. Further, the degree of scattering of the light rays 73h attained by the rough surface structure 6c can be adjusted by the height or intervals of the rough surface structure 6c. It becomes possible to adjust so that the degree of scattering of the light rays 73h attained by the rough surface structure 6c becomes smaller as compared to the degree of refraction of the light rays attained by the light incident surface 61 or the light emitting surface 62. Further, the rough surface structure 6c can be obtained by performing simple surface work after or in molding the light-distribution control element 6.

A method of manufacturing the planar light source apparatus 204 according to the fourth preferred embodiment includes a step of preparing the light-distribution control element 6, and a step of forming the diffusion part 6a by forming the rough surface structure 6c by performing a roughening process on the front surface of at least one surface of the plurality of surfaces structuring the outer shape of the light-distribution control element 6. The at least one surface where the rough surface structure 6c is formed is a surface different from the installation surface 63 capable of abutting on the main surface 81 of the holding substrate 8. In the fourth preferred embodiment, the at least one surface is the light incident surface 61. The method of manufacturing the planar light source apparatus 204 having such a structure is advantageous in that the rough surface structure 6c can be obtained by performing simple surface work after or in molding the light-distribution control element 6.

Modification of Fourth Preferred Embodiment

A description will be given of a planar light source apparatus according to a modification of the fourth preferred embodiment. The description of the structure similar to that in the fourth preferred embodiment will not be repeated.

Figure 16:
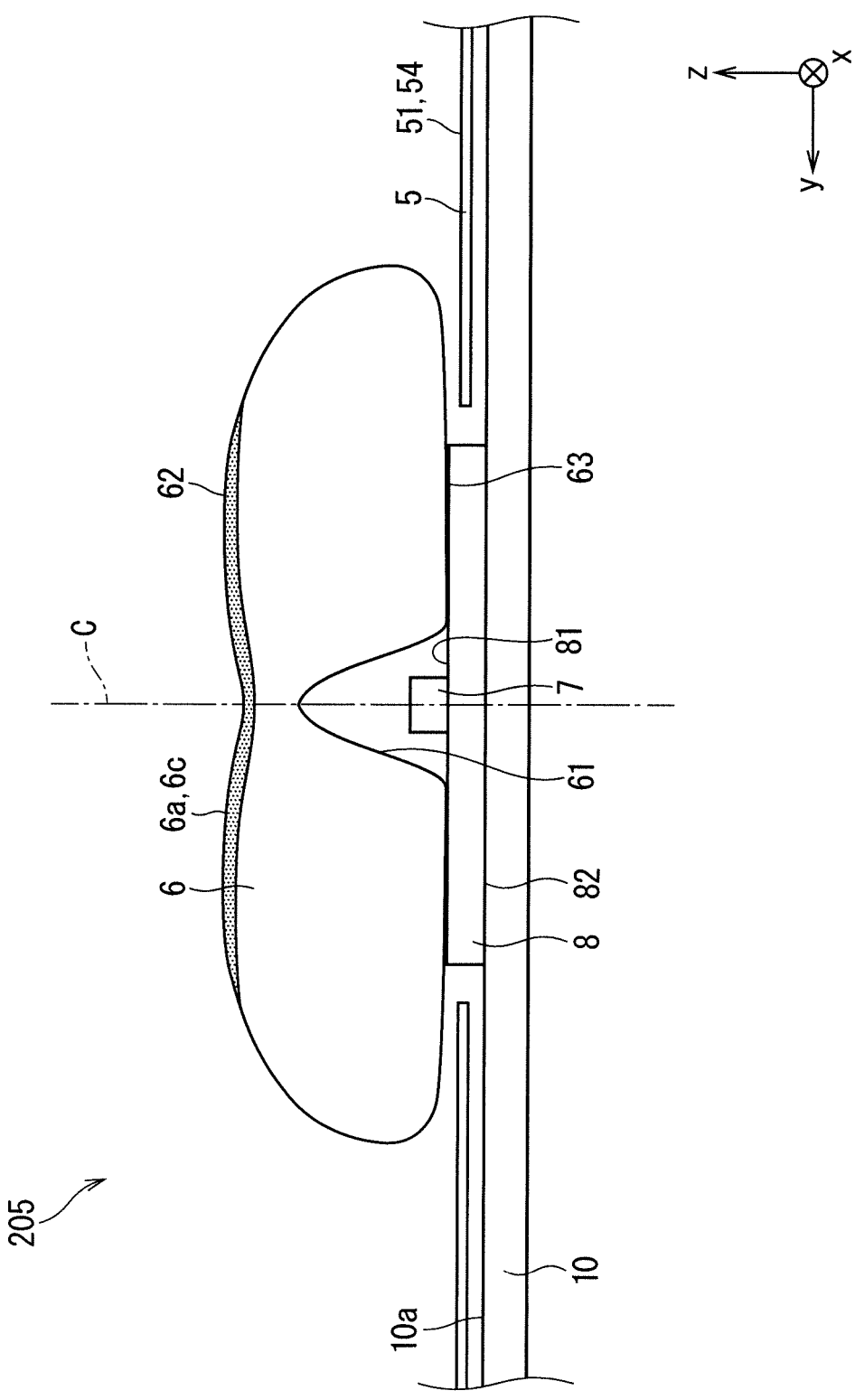
FIG. 16 is a section view showing the structure around light source of a planar light source apparatus according to a modification of the fourth preferred embodiment.

FIG. 16 is a diagram showing the structure around the light source 7 of a planar light source apparatus 205 according to a modification of the fourth preferred embodiment. In the present modification, the at least one surface where the rough surface structure 6c being the diffusion part 6a is formed is the light emitting surface 62. The rough surface structure 6c is formed along the surface of the light emitting surface 62. Note that, while the rough surface structure 6c shown in FIG. 16 is formed on the upper surface side (the +z-axis direction) of the light emitting surface 62, the rough surface structure 6c may be formed so as to cover also the side surface (the surface in the y-axis direction). The planar light source apparatus 205 having such a structure exhibits the optical effect similar to that exhibited by the planar light source apparatus 204 according to the fourth preferred embodiment. Further, since the light emitting surface 62 is greater in area than the light incident surface 61, the rough surface structure 6c is easily formed.

Further, while not shown in the drawing, the rough surface structure 6c may be formed along both the light incident surface 61 and the light emitting surface 62. A planar light source apparatus including such a structure exhibits the effect similar to that described above.

Fifth Preferred Embodiment

A description will be given of a planar light source apparatus according to a fifth preferred embodiment. The description of the structure similar to that in the fourth preferred embodiment will not be repeated.

Figure 17:
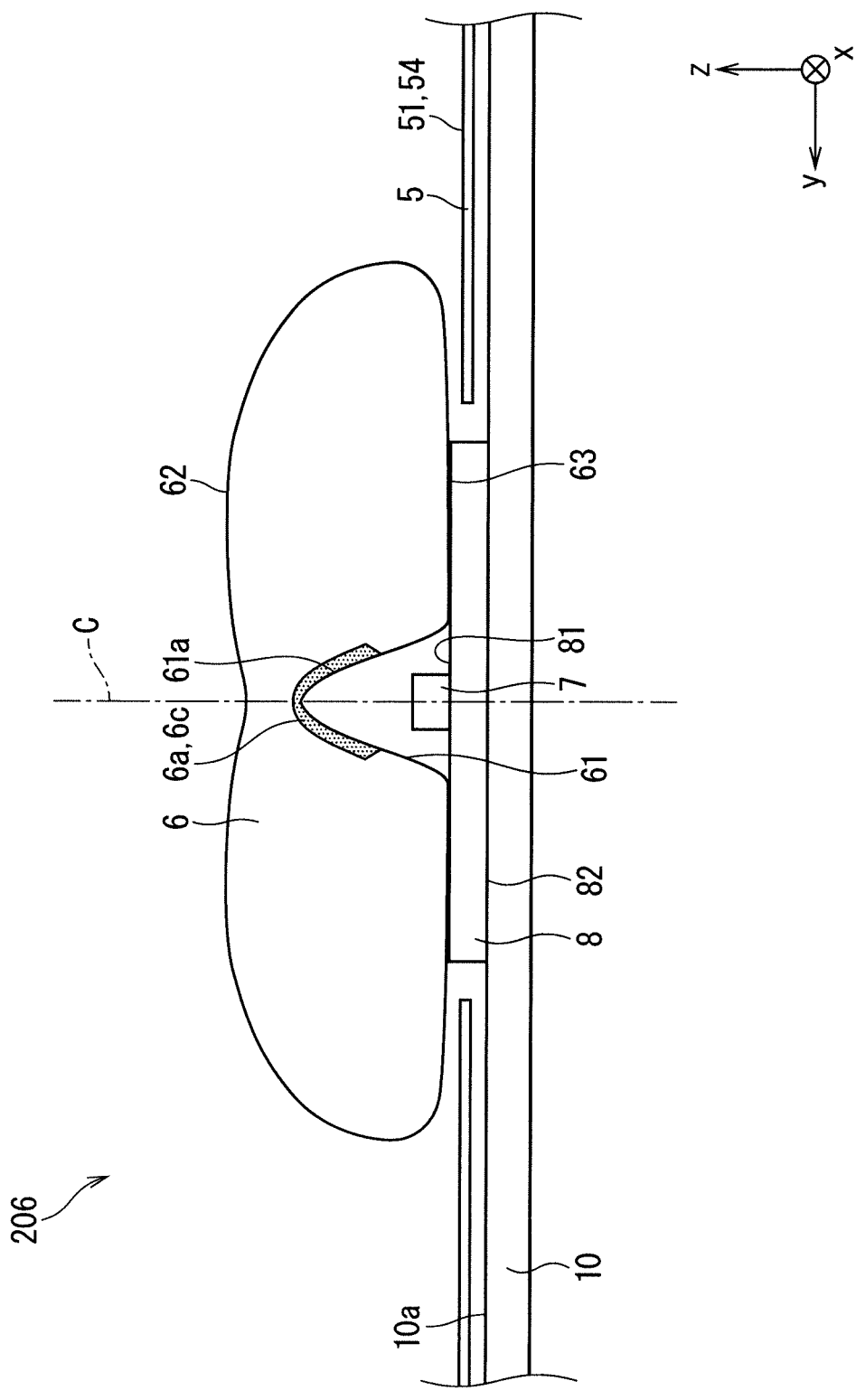
FIG. 17 is a section view showing the structure around light source of a planar light source apparatus according to a fifth preferred embodiment.

FIG. 17 is a diagram showing the structure around the light source 7 of a planar light source apparatus 206 according to the fifth preferred embodiment. The rough surface structure 6c being the diffusion part 6a is provided at the partial region 61a of the light incident surface 61. That is, in the fifth preferred embodiment, the rough surface structure 6c is provided at the partial region 61a at the front surface of at least one of the plurality of surfaces structuring the outer shape of the light-distribution control element 6.

The density of light rays becoming incident on the light incident surface 61 of the light-distribution control element 6, that is, the light intensity per unit area differs among the sites in the light incident surface 61. The required surface shape precision depends on the density of light rays. The rough surface structure 6c according to the fifth preferred embodiment is formed at the partial region 61a corresponding to the site where high surface shape precision is required. For example, in the case where higher surface shape precision than surrounding is required for a site being higher in the density of light rays than the surrounding site, the partial region 61a where the rough surface structure 6c is formed is the region higher in the density of light rays passing therethrough than the surrounding region.

The planar light source apparatus 206 including such a structure improves robustness in relation to disposition of the light-distribution control element 6 and the holding substrate 8, or disposition of the light-distribution control element 6 and the light sources 7. Further, this structure can reduce the area for forming the rough surface structure 6c, whereby the manufacturing costs of the light-distribution control element 6 can be reduced.

Similarly, the density of light rays becoming incident on the light emitting surface 62 differs among the sites in the light emitting surface 62. While not shown in the drawing, a planar light source apparatus in which the rough surface structure is formed at the partial region where the density of light rays is high in the light emitting surface 62 also exhibits the effect similar to that exhibited by the fifth preferred embodiment.

As described above, the diffusion part 6a according to the first to third preferred embodiments is formed to contain a diffusing material, and the diffusion part 6a according to the fourth and fifth preferred embodiments includes the rough surface structure 6c. While not shown in the drawing, the diffusion part may have a structure in which the rough surface structure 6c is provided at the front surface of the diffusion part 6a containing the diffusing material. Such a structure may be formed by, for example, applying friction to the front surface of the diffusion part 6a when integrally molding the diffusion part 6a containing the diffusing material and the light-distribution control element body 6b by double extrusion molding in the step of preparing the light-distribution control element 6.

In the foregoing preferred embodiments, the terms "parallel", "perpendicular" and the like are used for describing the positional relationship or the shape of components. These terms include the range in which tolerance in manufacture or variations in assembly are taken into consideration. Accordingly, the description of the positional relationship or the shape of components in the claims includes the range in which tolerance in manufacture or variations in assembly are taken into consideration.

Note that, the preferred embodiments of the present invention can be appropriately combined, modified, or omitted within the scope of the invention. While the present invention has been described in detail, the foregoing description is in all aspects illustrative and not restrictive. It is construed that numerous modifications that have not been exemplarily shown can be devised without departing from the scope of the present invention.

While the invention has been shown and described in detail, the foregoing description is in all aspects illustrative and not restrictive. It is therefore understood that numerous modifications and variations can be devised without departing from the scope of the invention.

What is claimed is:

1. A planar light source apparatus comprising:
a light source;
a holding substrate that holds said light source at a main surface; and
a light-distribution control element that is disposed at said main surface of said holding substrate so as to cover said light source, and changes light distribution of light rays emitted from said light source, wherein
said light-distribution control element includes a diffusion part that is provided at at least one surface of a plurality of surfaces structuring on outer shape of said light-distribution control element,
said diffusion part diffuses said light rays incident on said at least one surface of said light-distribution control element from one direction in a plurality of traveling directions, and
said at least one surface where said diffusion part is provided is a surface different from an installation surface capable of abutting on said main surface of said holding substrate.

2. The planar light source apparatus according to claim 1, wherein
said plurality of surfaces being surfaces different form said installation surface include a light incident surface that is positioned so as to cover said light source and on which said light rays emitted from said light source become incident, and a light emitting surface from which said light rays becoming incident on said light incident surface are emitted, and
said at least one surface where said diffusion part is provided is said light incident surface or said light emitting surface.

3. The planar light source apparatus according to claim 2, wherein
said light source includes a plurality of light sources that are discretely disposed in a row at said main surface of said holding substrate,
said light-distribution control element has a longitudinal direction an arrangement direction of said plurality of light sources,
said light incident surface extends in said longitudinal direction and includes a concave curved surface or a flat surface that covers said plurality of light sources,
said light emitting surface includes a convex cylindrical surface in a plane being perpendicular to said longitudinal direction, and
said diffusion part extends in said longitudinal direction.

4. The planar light source apparatus according to claim 1, wherein
said diffusion part is formed by said light-distribution control element that contains a diffusing material.

5. The planar light source apparatus according to claim 4, wherein
said diffusion part is provided at a front surface of said at least one surface to include a smooth surface.

6. The planar light source apparatus according to claim 1, wherein
said diffusion part is provided at a front surface of said at least one surface to include a rough surface structure.

7. The planar light source apparatus according to claim 1, wherein
said diffusion part is provided at a partial region of said at least one surface.

8. The planar light source apparatus according to claim 7, wherein
said partial region of said at least one surface where said diffusion part is provided is a region where light intensity per unit area in said partial region is higher than light intensity per unit area in a region of said at least one surface that is different from said partial region.

9. The planar light source apparatus according to claim 1, wherein
a thickness distribution of said diffusion part is even.

10. The planar light source apparatus according to claim 1, wherein
a thickness distribution of said diffusion part is uneven.

11. The planar light source apparatus according to claim 10, wherein
said diffusion part has said thickness distribution that corresponds to density distribution of said light rays transmitting through said at least one surface.

12. The planar light source apparatus according to claim 1, wherein
said light-distribution control element further includes a light-distribution control element body that is higher in transparency than said diffusion part, and
said diffusion part and said light-distribution control element body are integrated with each other.

13. A display apparatus comprising:
planar light source apparatus; and
a display panel that converts planar light emitted from said planar light source apparatus into image light, wherein
said planar light source apparatus, includes a light source, a holding substrate that holds said light source at a main surface, and a light-distribution control element that is disposed at said main surface of said holding substrate so as to cover said light source, and changes light, distribution of light rays emitted from said light source,
said light-distribution control element includes a diffusion part that is provided at at least one surface of a plurality of surfaces structuring an outer shape of said light-distribution control element,
said diffusion part diffuses said light rays incident on said at least one surface of said light-distribution control element from one direction in a plurality of traveling directions, and
said at least one surface where said diffusion part is provided is a surface different from an installation surface capable of abutting on said main surface of said holding substrate.

14. A method of manufacturing a planar light source apparatus including a light source, a holding substrate that holds said light source at a main surface, and a light-distribution control element that is disposed at said main surface of said holding substrate so as to cover said light source, and changes light distribution of light rays emitted from said light source, the method, comprising:
preparing said light-distribution control element, wherein said light-distribution control element includes a diffusion part that is provided at at least one surface of a plurality of surfaces structuring an outer shape of said light-distribution control element,
said diffusion part diffuses said light rays incident on said at least one surface of said light-distribution control element from one direction in a plurality of traveling directions,
said preparing said light-distribution control element includes forming said diffusion part by double extrusion modeling at said at least one surface of said plurality of surfaces structuring said outer shape of said light-distribution control element, and
said at least one surface where said diffusion part is formed is a surface different from an installation surface capable of abutting on said main surface of said holding substrate.

* * * * *